(12) United States Patent
Sasaki

(10) Patent No.: US 6,624,970 B1
(45) Date of Patent: Sep. 23, 2003

(54) THIN-FILM MAGNETIC HEAD HAVING AN INDUCTION-TYPE MAGNETIC TRANSDUCER AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 65 days.

(21) Appl. No.: 09/583,946

(22) Filed: May 31, 2000

(30) Foreign Application Priority Data

Jun. 15, 1999 (JP) .......................................... 11-167690

(51) Int. Cl.[7] ................................................. G11B 5/31
(52) U.S. Cl. ........................................................ 360/126
(58) Field of Search ........................................... 360/126

(56) References Cited

U.S. PATENT DOCUMENTS

| | | | | |
|---|---|---|---|---|
| 5,245,493 A | * | 9/1993 | Kawabe et al. ............. | 360/122 |
| 5,438,747 A | | 8/1995 | Krounbi et al. ............. | 29/603.01 |
| 5,473,491 A | * | 12/1995 | Fujisawa et al. ............ | 360/119 |
| 5,805,391 A | * | 9/1998 | Chang et al. ................ | 360/122 |
| 5,872,693 A | * | 2/1999 | Yoda et al. .................. | 360/126 |
| 6,104,576 A | * | 8/2000 | Santini ........................ | 360/126 |
| 6,111,724 A | * | 8/2000 | Santini ........................ | 119/317 |
| 6,353,511 B1 | * | 3/2002 | Shi et al. ..................... | 360/126 |

FOREIGN PATENT DOCUMENTS

| | | |
|---|---|---|
| JP | A-60-10409 | 1/1985 |
| JP | A-62-245509 | 10/1987 |
| JP | A-7-262519 | 10/1995 |

\* cited by examiner

*Primary Examiner*—David Davis
(74) *Attorney, Agent, or Firm*—Oliff & Berridge PLC

(57) ABSTRACT

A recording head has a bottom pole layer and a top pole layer that include pole portions opposed to each other, a recording gap layer being placed between the pole portions. The recording head further has a thin-film coil. The top pole layer includes first and second pole portion layers and a yoke portion layer. An insulating layer for defining a throat height is placed in a portion between the recording gap layer and a part of a surface of the second pole portion layer that does not touch a surface of the first pole portion layer. A coil encasing portion is formed such that this portion has a depth that extends from the level of the recording gap layer toward the bottom pole layer and toward the top pole layer. The thin-film coil is placed in the coil encasing portion.

35 Claims, 17 Drawing Sheets

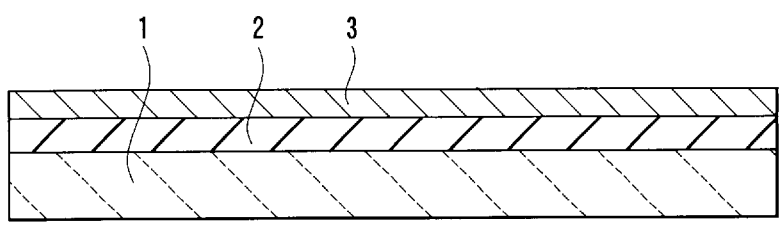 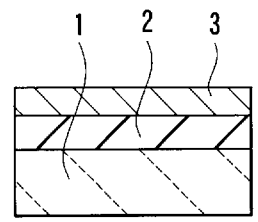
FIG. 1A    FIG. 1B
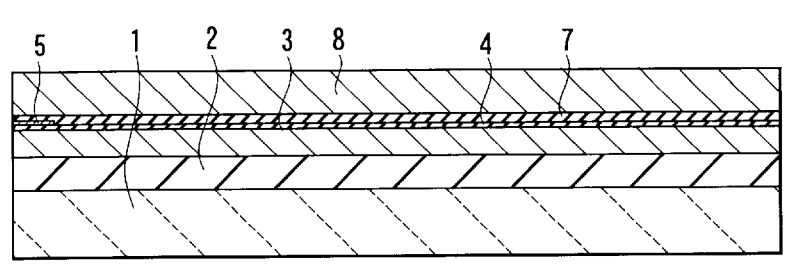 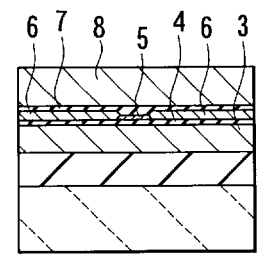
FIG. 2A    FIG. 2B

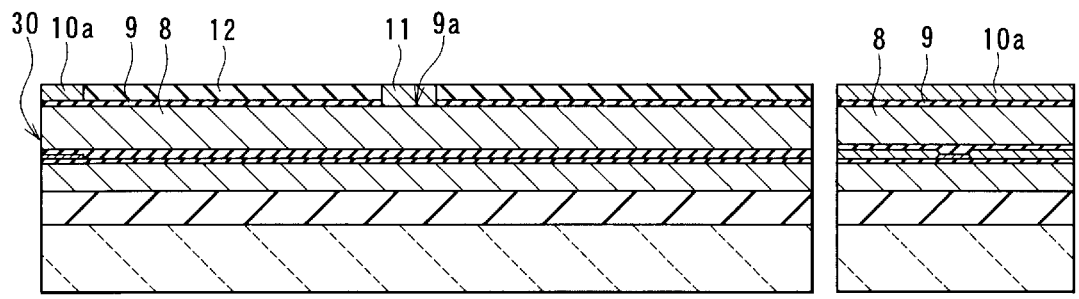 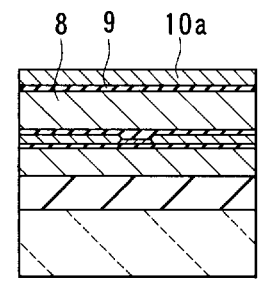
FIG. 3A    FIG. 3B
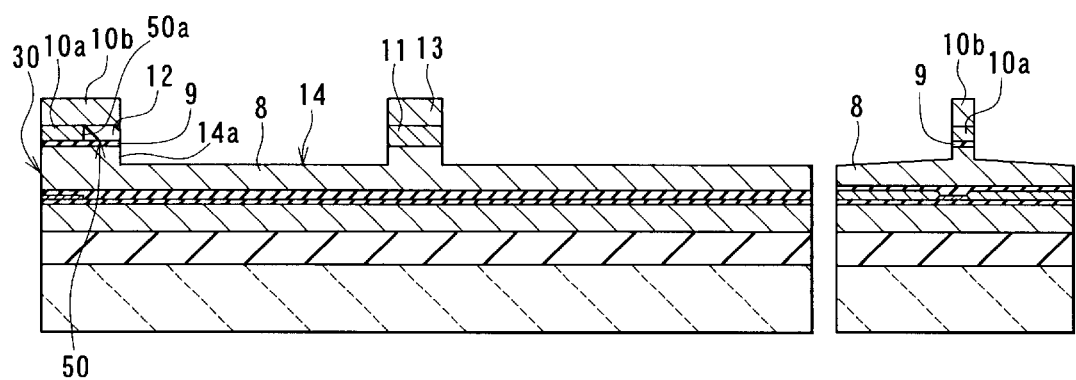 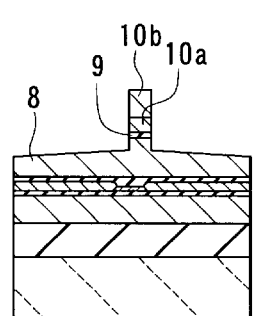
FIG. 4A    FIG. 4B

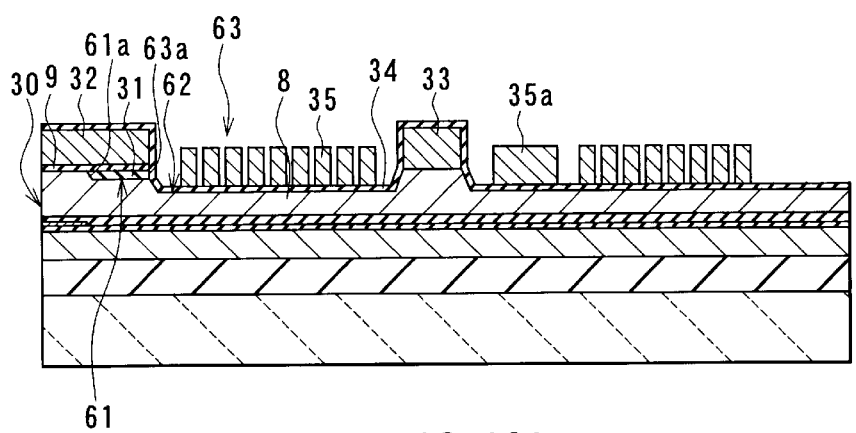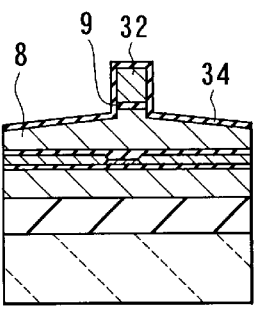
FIG. 13A  FIG. 13B
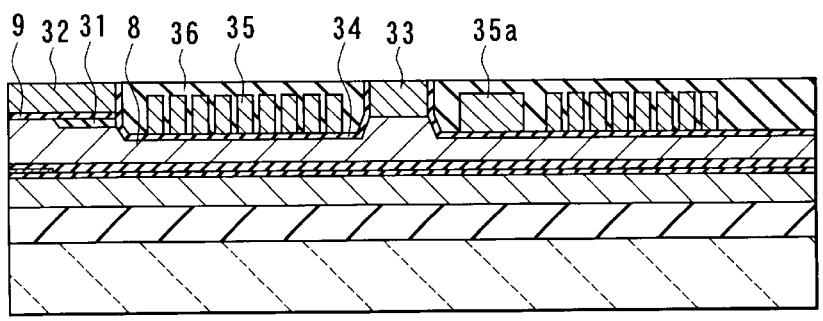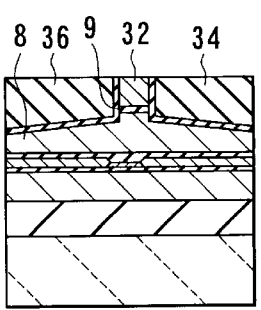
FIG. 14A  FIG. 14B

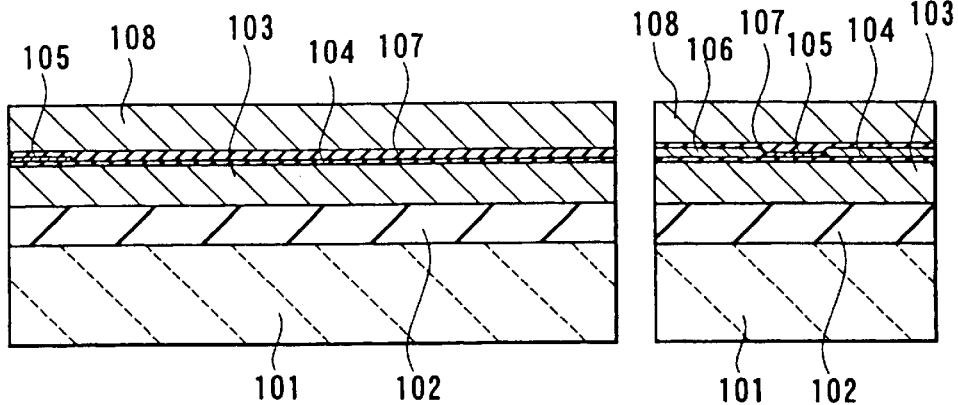
FIG. 19A
PRIOR ART
FIG. 19B
PRIOR ART
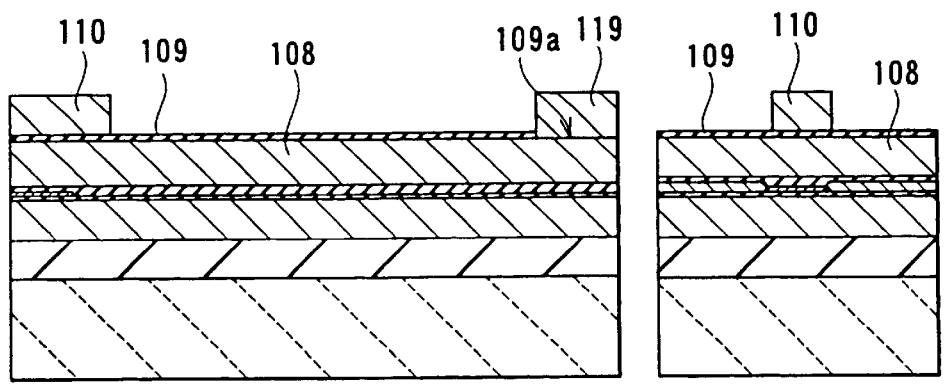
FIG. 20A
PRIOR ART
FIG. 20B
PRIOR ART

THIN-FILM MAGNETIC HEAD HAVING AN INDUCTION-TYPE MAGNETIC TRANSDUCER AND METHOD OF MANUFACTURING SAME

BACKGROUND OF THE INVENTION

1. Field of the Invention

The present invention relates to a thin-film magnetic head having at least an induction-type magnetic transducer and a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to microns or the order of submicron. Semiconductor process techniques are utilized to implement such a structure.

Reference is now made to FIG. 19A to FIG. 22A and FIG. 19B to FIG. 22B to describe an example of a method of manufacturing a composite thin-film magnetic head as an example of a related-art method of manufacturing a thin-film magnetic head. FIG. 19A to FIG. 22A are cross sections each orthogonal to an air bearing surface of the thin-film magnetic head. FIG. 19B to FIG. 22B are cross sections of a pole portion of the head each parallel to the air bearing surface.

In the manufacturing method, as shown in FIG. 19A and FIG. 19B, an insulating layer 102 made of alumina ($Al_2O_3$), for example, having a thickness of about 5 to 10 µm is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a bottom pole layer (top shield leyer) 108 having a thickness of about 3 µm is formed. The bottom pole layer 108 is made of a magnetic material and used for both a reproducing head and a recording head.

Next, as shown in FIG. 20A and FIG. 20B, on the bottom pole layer 108, a recording gap layer 109 made of an insulating film such as an alumina film whose thickness is 0.2 µm is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 µm is formed for the recording head. At the same time, a magnetic layer 119 made of a magnetic material is formed for making the magnetic path in the contact hole 109a for making the magnetic path.

Next, as shown in FIG. 21A and FIG. 21B, the recording gap layer 109 and the bottom pole layer 108 are etched through ion milling, using the top pole tip 110 as a mask. As shown in FIG. 21B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of an alumina film, for example, and having a thickness of about 3 µm is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific pattern on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific pattern on the photoresist layer 113 and the second layer 114. Heat treatment is then performed at a specific temperature to flatten the surface of the photoresist layer 115.

Next, as shown in FIG. 22A and FIG. 22B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the thin-film magnetic head including the recording head and the reproducing head. The thin-film magnetic head is thus completed.

FIG. 23 is a top view of the thin-film magnetic head shown in FIG. 22A and FIG. 22B. The overcoat layer 117 and the other insulating layers and insulating films are omitted in FIG. 23.

In FIG. 22A, 'TH' indicates the throat height and 'MR-H' indicates the MR height. The throat height is the length (height) of portions of magnetic pole layers facing each other with a recording gap layer in between, between the air-bearing-surface-side end and the other end. The MR height is the length (height) between the air-bearing-surface-side end of the MR element and the other end. In FIG. 22B, 'P2W' indicates the pole width, that is, the recording track width. In addition to the throat height, the MR height and so on, the apex angle as indicated with θ in FIG. 22A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 22A and FIG. 22B.

To achieve high surface recording density, that is, to fabricate a recording head with a narrow track structure, it has been particularly required that track width P2W fall within the submicron order of 1.0 µm or less. It is therefore required to process the top pole into the submicron order through semiconductor process techniques.

A problem is that it is difficult to form the top pole layer on the apex into small dimensions.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 µm or more. The photoresist whose thickness is 3 to 4 µm is applied to cover the apex. If the photoresist thickness is required to be at least 3 µm over the apex, a photoresist film having a thickness of 8 to 10 µm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order-on top of the apex through the use of a photoresist film having a thickness of 8 to 10 µm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing related-art manufacturing steps illustrated in FIG. 20A to FIG. 22A and FIG. 20B to FIG. 22B. In this method, a track width of 1.0 µm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible that the top pole tip 110 that defines the track width is formed into small dimensions to some degree on the flat top surface of the recording gap layer 109.

However, the following problems are still found in the thin-film magnetic head having a structure as shown in FIG. 22A and FIG. 22B.

In the thin-film magnetic head shown in FIG. 22A and FIG. 22B, the recording track width is defined by the top pole tip 110. Therefore, it is not necessary that the top pole layer 116 is processed into dimensions as small as those of the top pole tip 110. However, if the recording track width is extremely reduced, that is, down to 0.5 µm or less, in particular, processing accuracy for achieving the submicron-order width is required for the top pole layer 116, too. However, the top pole layer 116 is formed on top of the apex in the head shown in FIG. 22A and FIG. 22B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by the thin-film magnetic head on a side of the top pole layer 116, too, and so-called 'side write' may result, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

In the thin-film magnetic head shown in FIG. 22A and FIG. 22B, the cross-sectional area of the magnetic path abruptly decreases in a portion where the top pole layer 116 is in contact with the top pole tip 110. Consequently, the magnetic flux is saturated in this portion, and it is impossible to efficiently utilize the magnetomotive force generated by the layers 112 and 114 of the thin-film coil for recording. This problem more often results when the throat height is small, in particular.

Furthermore, in a prior-art magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position (the position of the air-bearing-surface-side end of the insulating layer that defines the throat height) and the outermost end of the coil is a major factor that prevents a reduction in yoke length. Since the yoke length of a two-layer coil can be shorter than that of a single-layer coil, a two-layer coil is adopted to many recording heads for high frequency application. However, in the prior-art magnetic head, a photoresist film having a thickness of about 2 µm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shortened.

Therefore, if the total coil thickness is 2 to 3 µm, the thickness of the insulating film between the layers of the coil is 2 µm, and the apex angle is 45 to 55 degrees, for example, the yoke length is required to be 6 to 8 µm which is twice as long as the distance between the outermost end of the coil and the neighborhood of the zero throat height position, that is, 3 to 4 µm (the distance between the innermost end of the coil and the portion where the top and bottom pole layers are in contact with each other is required to be 3 to 4 µm, too), in addition to the length of the portion corresponding to the coil. This length of the portion other than the portion corresponding to the coil is one of the factors that prevent a reduction in yoke length. Assuming that a two-layer eleven-turn coil whose line width is 1.2 µm and the space is 0.8 µm is fabricated, for example, the portion of the yoke length corresponding to the first layer 112 of the coil is 11.2 µm, if the first layer is made up of six turns and the second layer is made up of 5 turns, as shown in FIG. 22A and FIG. 22B. In addition to this length, the total of 6 to 8 µm, that is, the distance between each of the outermost and innermost ends of the first layer 112 of the coil and each of ends of the photoresist layer 113 for insulating the first layer 112, is required for the yoke length. Therefore, the yoke length is 17.2 to 19.2 µm. If an 11-turn coil is made up of one layer, the yoke length is 27.2 to 29.2 m. In the present patent application, the yoke length is the length of a portion of the pole layer except the pole portion and the contact portions, as indicated with $L_0$ in FIG. 22A. As thus described, it is difficult in the prior art to further reduce the yoke length, which prevents improvements in the high frequency characteristic.

A reduction in yoke length is achieved if the coil thickness is increased and the line width is reduced. However, if the coil thickness of the prior-art head is increased, the height of the apex is thereby increased. It is therefore difficult to reduce the size of the top pole layer as described above.

OBJECT AND SUMMARY OF THE INVENTION

It is an object of the invention to provide a thin-film magnetic head and a method of manufacturing the same for achieving reductions in track width and yoke length of an induction-type magnetic transducer and for preventing saturation of a magnetic flux halfway through a magnetic path. A thin-film magnetic head of the present invention comprises: a medium facing surface that faces toward a recording medium and a first and second magnetic layers magnetically coupled to each other and including magnetic pole portions opposed to each other and placed in regions of the magnetic layers on a side of the medium facing surface. Each magnetic layer includes at least one layer; the thin-film magnetic head further comprises a gap layer, provided between the pole portions of the first and second magnetic layers, and a thin-film coil, at least a part of which is placed between the first and second magnetic layers, and insulated from the first and second magnetic layers. The head further comprises: an insulating layer encasing portion formed in one of the magnetic layers having an end on a side of the medium facing surface, the end defining a throat height. The insulating layer encasing portion is provided for encasing an insulating layer for defining the throat height, and a coil encasing portion having a depth that extends from a level of the gap layer toward the first magnetic layer and toward the second magnetic layer. The coil encasing portion has an end on a side of the medium facing surface located farther from the medium facing surface than the end of the insulating layer encasing portion. The coil encasing portion is provided for encasing the at least part of the coil. The at least part of the coil is placed in the coil encasing portion.

A method of the invention is provided for manufacturing a thin-film magnetic head comprising: a medium facing surface that faces toward a recording medium; a first magnetic layer and a second magnetic layer magnetically coupled to each other and including magnetic pole portions oppose to each other placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers.

The method includes the steps of: forming the first magnetic layer, forming the gap layer on the first magnetic layer, forming the second magnetic layer on the gap layer and forming the coil such that the at least part of the coil is placed between the first and second magnetic layers, the at least part of the coil being insulated from the first and second magnetic layers. The step of forming one of the magnetic layers includes formation of an insulating layer encasing portion in the magnetic layer. The insulating layer encasing portion has an end on a side of the medium facing surface, the end defining a throat height. The insulating layer encasing portion is provided for encasing an insulating layer for defining the throat height. The method further includes the steps of: forming the insulating layer for defining the throat height placed in the insulating layer encasing portion and forming a coil encasing portion. The coil encasing portion has a depth that extends from a level of the gap layer toward the first magnetic layer and toward the second magnetic layer, and has an end on a side of the medium facing surface located farther from the medium facing surface than the end of the insulating layer encasing portion. The coil encasing portion is provided for encasing the at least part of the coil. The at least part of the coil is placed in the coil encasing portion in the step of forming the coil.

According to the thin-film magnetic head or the method of manufacturing the same of the invention, at least a part of the thin-film coil is placed in the coil encasing portion having a depth that extends from the level of the gap layer toward the first magnetic layer and toward the second magnetic layer. In the invention the throat height is defined by the end of the insulating layer encasing portion formed in one of the magnetic layers, the end being on a side of the medium facing surface. The end of the coil encasing portion on a side of the medium facing surface is located farther from the medium facing surface than the end of the insulating layer encasing portion.

According to the thin-film magnetic head or the method of manufacturing the same of the invention, the at least part of the coil placed in the coil encasing portion may be located so as to extend from the level of the gap layer toward the first magnetic layer and toward the second magnetic layer.

According to the thin-film magnetic head of the invention, the second magnetic layer may include: a first pole portion layer forming a part of one of the pole portions, having a width equal to a recording track width and a length equal to the throat height, one of surfaces of the first pole portion layer being adjacent to the gap layer; a second pole portion layer including the other part of the one of the pole portions, a part of one of surfaces of the second pole portion layer touching the other surface of the first pole portion layer, the part of the second pole portion layer touching the first pole portion layer having a width equal to the width of the first pole portion layer, an entire length of the second pole portion layer being greater than the length of the first pole portion layer; and a yoke portion layer making up a yoke portion and connected to the other surface of the second pole portion layer. In addition, the insulating layer encasing portion may be formed between the gap layer and a part of the one of the surfaces of the second pole portion layer that does not touch the other surface of the first pole portion layer.

If the magnetic head has the above-described configuration, the distance between the medium facing surface and an end of the second pole portion layer opposite to the medium facing surface may be equal to the distance between the medium facing surface and the end of the coil encasing portion on the side of the medium facing surface. An end face of the yoke portion layer that faces toward the medium facing surface may be located at a distance from the medium facing surface. A surface of the insulating layer for defining the throat height that faces the second pole portion layer may be flattened, together with the other surface of the first pole portion layer. The magnetic head of the invention may further comprise an additional insulating layer that covers the at least part of the coil located in the coil encasing portion and has a surface facing the yoke portion layer, the surface being flattened together with the other surface of the second pole portion layer. The thin-film coil may include: a first portion placed in the coil encasing portion; and a second portion located between the first portion and the yoke portion layer. The magnetic head of the invention may further comprise an additional insulating layer that covers the first portion of the coil placed in the coil encasing portion and has a surface facing the yoke portion layer, the surface being flattened together with the other surface of the second pole portion layer, the second portion of the coil being located between the additional insulating layer and the yoke portion layer.

In the magnetic head of the invention the first magnetic layer may include: a first concavity formed in a surface of the first magnetic layer facing the gap layer and provided as the insulating layer encasing portion; and a second concavity formed in the surface of the first magnetic layer facing the gap layer, the second concavity having a depth greater than a depth of the first concavity and forming a part of the coil encasing portion.

If the magnetic head has the above-described configuration, a surface of the insulating layer for defining the throat height facing the gap layer may be flattened together with the surface of the first magnetic layer facing the gap layer. The second magnetic layer may include: a pole portion layer making up one of the pole portions; and a yoke portion layer making up a yoke portion and connected to the pole portion layer. The distance between the medium facing surface and an end of the pole portion layer opposite to the medium facing surface may be equal to the distance between the medium facing surface and the end of the coil encasing portion on the side of the medium facing surface. The magnetic head of the invention may further comprise an additional insulating layer that covers the at least part of the coil located in the coil encasing portion and has a surface facing the yoke portion layer, the surface being flattened together with a surface of the pole portion layer facing the yoke portion layer. The thin-film coil may include: a first portion placed in the coil encasing portion; and a second portion located between the first portion and the yoke portion layer. The magnetic head of the invention may further comprise an additional insulating layer that covers the first portion of the coil placed in the coil encasing portion and has a surface facing the yoke portion layer, the surface being flattened together with a surface of the pole portion layer facing the yoke portion layer, the second portion of the coil being located between the additional insulating layer and the yoke portion layer.

The magnetic head of the invention may further comprise: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

According to the method of manufacturing the thin-film magnetic head of the invention, the step of forming the second magnetic layer may include the steps of: forming a first pole portion layer a portion of which makes up a part of one of the pole portions and has a length equal to the throat height, one of surfaces of the first pole portion layer being adjacent to the gap layer; forming a second pole portion layer including the other part of the one of the pole portions, a part of one of surfaces of the second pole portion layer touching the other surface of the first pole portion layer, the part of the second pole portion layer touching the first pole portion layer having a width equal to a recording track width, an entire length of the second pole portion layer being greater than the length of the portion of the first pole portion layer that makes up the part of the one of the pole portions; etching the first pole portion layer through the use of the second pole portion layer as a mask, such that the parts of the first and second pole portion layers touching each other are made equal in width; and forming a yoke portion layer making up a yoke portion and connected to the other surface of the second pole portion layer. In this case, the insulating layer encasing portion is formed between the gap layer and a part of the one of the surfaces of the second pole portion layer that does not touch the other surface of the first pole portion layer.

In this case, the coil encasing portion may be formed by etching the first magnetic layer through the use of the second pole portion layer as a mask in the step of forming the coil encasing portion. An end face of the yoke portion layer that faces toward the medium facing surface may be located at a distance from the medium facing surface in the step of forming the yoke portion layer. The method of the invention may further include the step of flattening a surface of the insulating layer for defining the throat height that faces the second pole portion layer, together with the other surface of the first pole portion layer. The method of the invention may further include the step of forming an additional insulating layer that covers the at least part of the coil located in the coil encasing portion and has a surface facing the yoke portion layer, the surface being flattened together with the other surface of the second pole portion layer. The step of forming the thin-film coil may include formation of: a first portion placed in the coil encasing portion; and a second portion located between the first portion and the yoke portion layer. The method of the invention may further include the step of forming an additional insulating layer that covers the first portion of the coil placed in the coil encasing portion and has a surface facing the yoke portion layer, the surface being flattened together with the other surface of the second pole portion layer. In this case, the second portion of the coil may be located between the additional insulating layer and the yoke portion layer in the step of forming the coil.

In the method of the invention the step of forming the first magnetic layer may include formation of a first concavity in a surface of the first magnetic layer facing the gap layer, the first concavity being provided as the insulating layer encasing portion. In addition, the step of forming the coil encasing portion may include formation of a second concavity in the surface of the first magnetic layer facing the gap layer, the second concavity having a depth greater than a depth of the first concavity and making up a part of the coil encasing portion.

In this case, the method may further include the step of flattening a surface of the insulating layer for defining the throat height facing the gap layer, together with the surface of the first magnetic layer facing the gap layer. The step of forming the second magnetic layer may include formation of: a pole portion layer making up one of the pole portions; and a yoke portion layer making up a yoke portion and connected to the pole portion layer. The coil encasing portion may be formed by etching the first magnetic layer through the use of the pole portion layer as a mask in the step of forming the coil encasing portion. The method of the invention may further include the step of forming an additional insulating layer that covers the at least part of the coil located in the coil encasing portion and has a surface facing the yoke portion layer, the surface being flattened together with a surface of the pole portion layer facing the yoke portion layer. The step of forming the thin-film coil may include formation of: a first portion placed in the coil encasing portion; and a second portion located between the first portion and the yoke portion layer. The method of the invention may further include the step of forming an additional insulating layer that covers the first portion of the coil placed in the coil encasing portion and has a surface facing the yoke portion layer, the surface being flattened together with a surface of the pole portion layer facing the yoke portion layer. In this case, the second portion of the coil is located between the additional insulating layer and the yoke portion layer in the step of forming the coil.

The method of the invention may further include the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer. In this case, at least one of the first and second insulating films may be formed through chemical vapor deposition.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 13A and FIG. 13B are cross sections for illustrating a step that follows FIG. 12A and FIG. 12B.

FIG. 14A and FIG. 14B are cross sections for illustrating a step that follows FIG. 13A and FIG. 13B.

FIG. 19A and FIG. 19B are cross sections for illustrating a step in a method of manufacturing a thin-film magnetic head of related art.

FIG. 20A and FIG. 20B are cross sections for illustrating a step that follows FIG. 19A and FIG. 19B.

DETAILED DESCRIPTION OF THE PREFERRED EMBODIMENTS

Figures 5A, 5B:
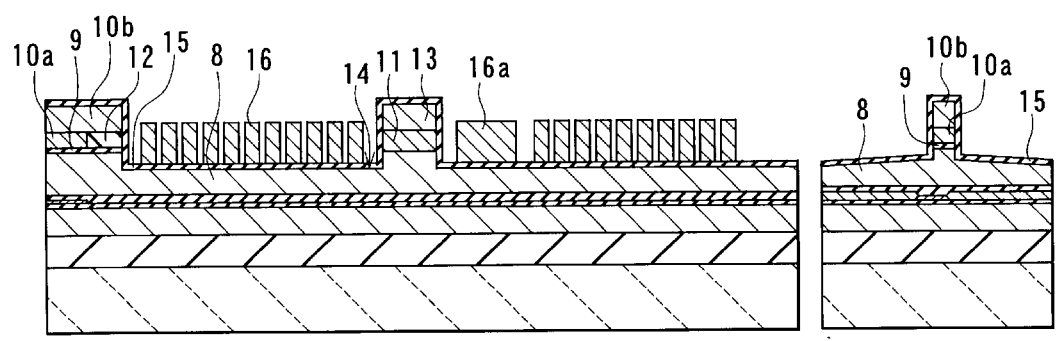
FIG. 5A and FIG. 5B are cross sections for illustrating a step that follows FIG. 4A and FIG. 4B.

Preferred embodiments of the invention will now be described in detail with reference to the accompanying drawings.

First Embodiment

Reference is now made to FIG. 1A to FIG. 7A, FIG. 1B to FIG. 7B, and FIG. 8 to describe a thin-film magnetic head and a method of manufacturing the same of a first embodiment of the invention. FIG. 1A to FIG. 7A are cross sections each orthogonal to an air bearing surface. FIG. 1B to FIG. 7B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD) using trimethyl aluminum $(Al(CH_3)_3)$ and $H_2O$, for example. Through the use of CVD, it is possible to make the thin and precise shield gap films 4 and 7 with few pinholes.

Next, on the top shield gap film 7 a bottom pole layer (top shield layer) 8 having a thickness of about 3 $\mu$m, for example, is selectively formed. The bottom pole layer 8 is made of a magnetic material and used for both a reproducing head and a recording head.

Next, as shown in FIG. 3A and FIG. 3B, a recording gap layer 9 made of an insulating material whose thickness is about 0.15 to 0.3 $\mu$m, for example, is formed on the bottom pole layer 8. In general, the insulating material used for the recording gap layer 9 may be alumina, aluminum nitride, a silicon-dioxide-base material, a silicon-nitride-base material, or diamond-like carbon (DLC) and so on.

Next, a portion of the recording gap layer 9 located in a region corresponding to a center portion of a thin-film coil described later is etched to form a contact hole 9a for making the magnetic path.

Next, a first pole portion layer 10a having a thickness of about 0.6 to 1.2 $\mu$m, for example, is formed on a portion of the recording gap layer 9 in a neighborhood of an end of the recording gap layer 9 on a side of the air bearing surface 30. The first pole portion layer 10a is made of a magnetic material and forms a part of the pole portion of the top pole layer. At the same time, a magnetic layer 11 made of a magnetic material and having a thickness of about 0.6 to 1.2 $\mu$m, for example, is formed for making the magnetic path in the contact hole 9a for making the magnetic path. At this point in the manufacturing process, the width of the first pole portion layer 10a (that is, the dimension in the horizontal direction in FIG. 3B) is greater than the recording track width. The length of a portion of the first pole portion layer 10a to be the part of the pole portion (that is, the dimension in the horizontal direction in FIG. 3A) is equal to the throat height.

Next, an insulating layer 12 made of alumina, for example, having a thickness of about 1.0 to 2.0 $\mu$m, for example, is formed over the entire surface. The insulating layer 12 is then polished through CMP, for example, until the first pole portion layer 10a and the magnetic layer 11 are exposed, and the surface is flattened. Through this polishing, the thickness of the first pole portion layer 10a is made approximately 0.5 to 1.0 $\mu$m. In FIG. 3A the zero throat height position is the position of the interface between the first pole portion layer 10a and the insulating layer 12.

Next, as shown in FIG. 4A and FIG. 4B, a second pole portion layer 10b having a thickness of about 3.0 to 5.0 $\mu$m, for example, is formed on the first pole portion layer 10a. The second pole portion layer 10b is made of a magnetic material and includes a portion to be the other part of the pole portion of the top pole layer. At the same time, a magnetic layer 13 having a thickness of about 3.0 to 5.0 $\mu$m, for example, is formed on the magnetic layer 11. The width of a portion of the second pole portion layer 10b touching the first pole portion layer 10a is equal to the recording track width. The entire length of the second pole portion layer 10b is greater than the length of the portion of the first pole portion layer 10a to be the part of the pole portion.

The first pole portion layer 10a and the second pole portion layer 10b may be made of NiFe (80 weight % Ni and 20 weight % Fe), or NiFe (45 weight % Ni and 55 weight % Fe) as a high saturation flux density material and formed into specific patterns through plating or may be made of a material such as FeN or FeZrN as a high saturation flux density material through sputtering and selectively etched through ion milling, for example, into the specific patterns. Alternatively, a material such as CoFe or a Co-base amorphous material as a high saturation flux density material may be used.

Next, the first pole portion layer 10a and the insulating layer 12 are etched through ion milling using an argon-base gas, for example, with the second pole portion layer 10b and the magnetic layer 13 as masks. As a result, the width of the portion of the first pole portion layer 10a touching the second pole portion layer 10b is made equal to the width of the second pole portion layer 10b, that is, the recording track width.

Next, the recording gap layer 9 is selectively etched through dry etching, using the first pole portion layer 10a and the second pole portion layer 10b, and the magnetic layers 11 and 13 as masks. The dry etching may be reactive ion etching (RIE) using a chlorine-base gas such as $BCl_2$ or $Cl_2$, or a fluorine-base gas such as $CF_4$ or $SF_6$, for example.

Next, the bottom pole layer 8 is selectively etched by about 0.3 to 1.0 $\mu$m, using the first pole portion layer 10a and the second pole portion layer 10b, and the magnetic layers 11 and 13 as masks, through ion milling using an argon-base gas, for example. A trim structure as shown in FIG. 4B is thus formed. The trim structure suppresses an increase in the effective track width due to expansion of a magnetic flux generated during writing in a narrow track. Alternatively, a photomask (not shown) for trimming may be formed on a portion other than the region where etching is required before etching the recording gap layer 9 and the bottom pole layer 8.

When the bottom pole layer 8 is etched as described above, a concavity is formed in the region where the thin-film coil described later is to be formed, as shown in FIG. 4A. This concavity has a depth that extends from the level of the recording gap layer 9 toward the bottom pole layer 8 and toward the top pole layer (the pole portion layers 10a and 10b). The concavity is provided as a coil encasing portion 14.

After the bottom pole layer 8 is etched, a portion of the insulating layer 12 for defining the throat height remains between the recording gap layer 9 and a portion of a surface of the second pole portion layer 10b that does not touch the top surface of the first pole portion layer 10a, as shown in FIG. 4A. This insulating layer 12 corresponds to an insulating layer for defining a throat height of the invention. The portion in which the insulating layer 12 is placed is an insulating layer encasing portion 50 of this embodiment. The zero throat height position is the position of an end 50a of the encasing portion 50 on a side of the air bearing surface 30.

An end 14a of the coil encasing portion 14 closer to the air bearing surface 30 than the other end is located farther from the air bearing surface 30 than the end 50a of the insulating layer encasing portion 50 on a side of the air bearing surface 30, that is, than the zero throat height position. The distance between the air bearing surface 30 and the end 14a is equal to the distance between the air bearing surface 30 and an end of the second pole portion layer 10b opposite to the air bearing surface 30.

Since the second pole portion layer 10b is used as the mask when the bottom pole layer 8 is etched, the thickness of the second pole portion layer 10b is about 1.5 to 3.0 µm, for example, after the bottom pole layer 8 is etched.

Next, as shown in FIG. 5A and FIG. 5B, an insulating film 15 of alumina, for example, having a thickness of about 0.3 to 0.6 µm is formed over the entire surface. The insulating film 15 is provided for insulating the thin-film coil described later from the bottom pole layer 8. Next, the thin-film coil 16 made of copper (Cu), for example, is formed by frame plating on the insulating film 15 in the coil encasing portion 14. For example, the thickness of the coil 16 is about 1.0 to 2.0 µm and the pitch is 1.2 to 2.0 µm. The coil 16 is wound around the magnetic layers 11 and 13. In FIG. 5A numeral 16a indicates a portion for connecting the coil 16 to a conductive layer (lead) described later.

Figures 6A, 6B:
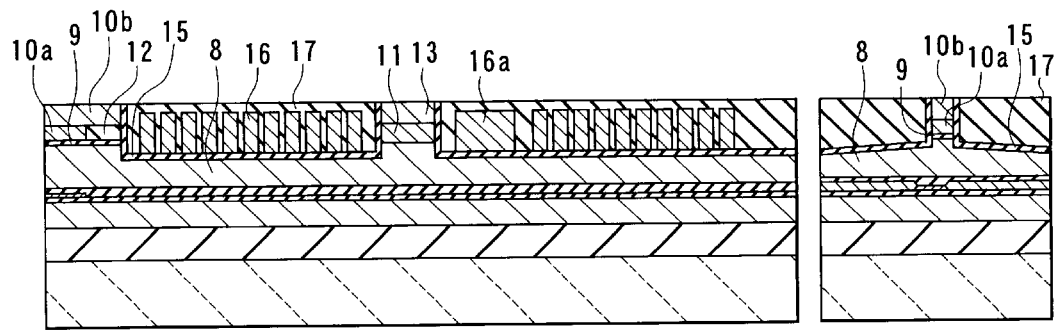
FIG. 6A and FIG. 6B are cross sections for illustrating a step that follows FIG. 5A and FIG. 5B.

Next, as shown in FIG. 6A and FIG. 6B, an insulating layer 17 of alumina, for example, having a thickness of about 3 to 4 µm is formed over the entire surface. The insulating layer 17 is then polished through CMP, for example, so that the second pole portion layer 10b and the magnetic layer 13 are exposed, and the surface is flattened. Although the coil 16 is not exposed in FIG. 6A, the coil 16 may be exposed. If the coil 16 is exposed, an insulating film is formed to cover the coil 16.

Figures 7A, 7B:
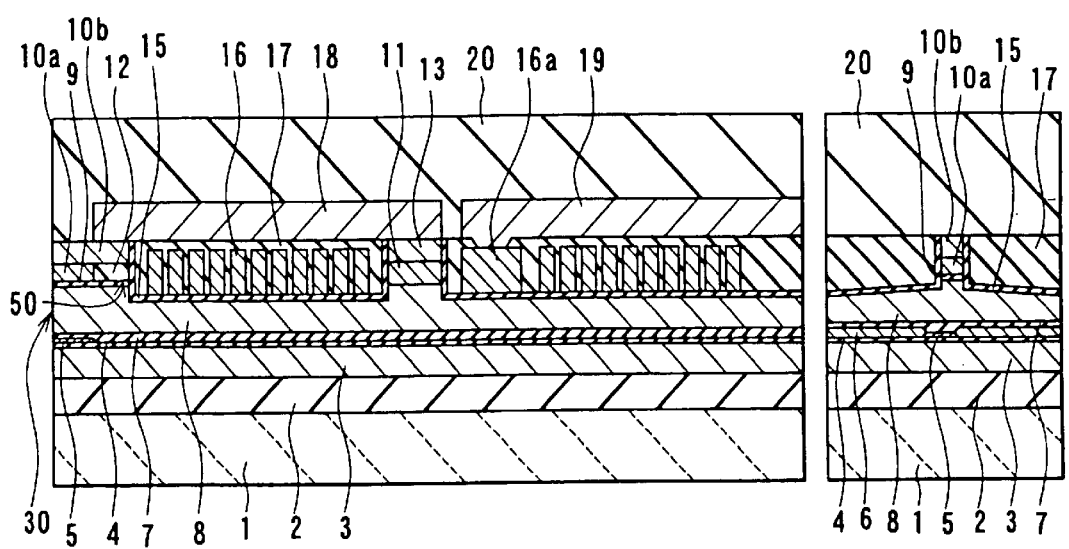
FIG. 7A and FIG. 7B are cross sections of the thin-film magnetic head of the first embodiment.

Next, as shown in FIG. 7A and FIG. 7B, a portion of the insulating layer 17 located on the connection portion 16a is etched to form a contact hole. A yoke portion layer 18 having a thickness of about 2.0 to 3.0 µm, for example, is formed to be a yoke portion of the top pole layer on the second pole portion layer 10b, the insulating layer 17 and the magnetic layer 13. At the same time, the conductive layer 19 having a thickness of about 2.0 to 3.0 µm, for example, and connected to the portion 16a is formed. The yoke portion layer 18 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used. To improve the high frequency characteristic, the yoke portion layer 18 may be made of a number of layers of inorganic insulating films and magnetic layers of Permalloy, for example.

An end face of the yoke portion layer 18 facing toward the air bearing surface 30 is located at a distance of only 0.5 to 1.0 µm, for example, from the air bearing surface 30. In this embodiment, in particular, the end face of the yoke portion layer 18 is located near the zero throat height position.

Next, an overcoat layer 20 of alumina, for example, having a thickness of 20 to 40 µm, for example, is formed over the entire surface. The surface of the overcoat layer 20 is then flattened and pads (not shown) for electrodes are formed on the overcoat layer 20. Finally, lapping of the slider is performed to form the air bearing surfaces 30 of the thin-film magnetic head including the recording head and the reproducing head. The thin-film magnetic head of the embodiment is thus completed.

In this embodiment the bottom pole layer 8 corresponds to a first magnetic layer of the invention. The top pole layer made up of the first pole portion layer 10a, the second pole portion layer 10b, the magnetic layers 11 and 13 and the yoke portion layer 18 corresponds to a second magnetic layer of the invention. The bottom shield layer 3 corresponds to a first shield layer of the invention. Since the bottom pole layer 8 also functions as the top shield layer, the bottom pole layer 8 corresponds to a second shield layer of the invention, too.

Figure 8:
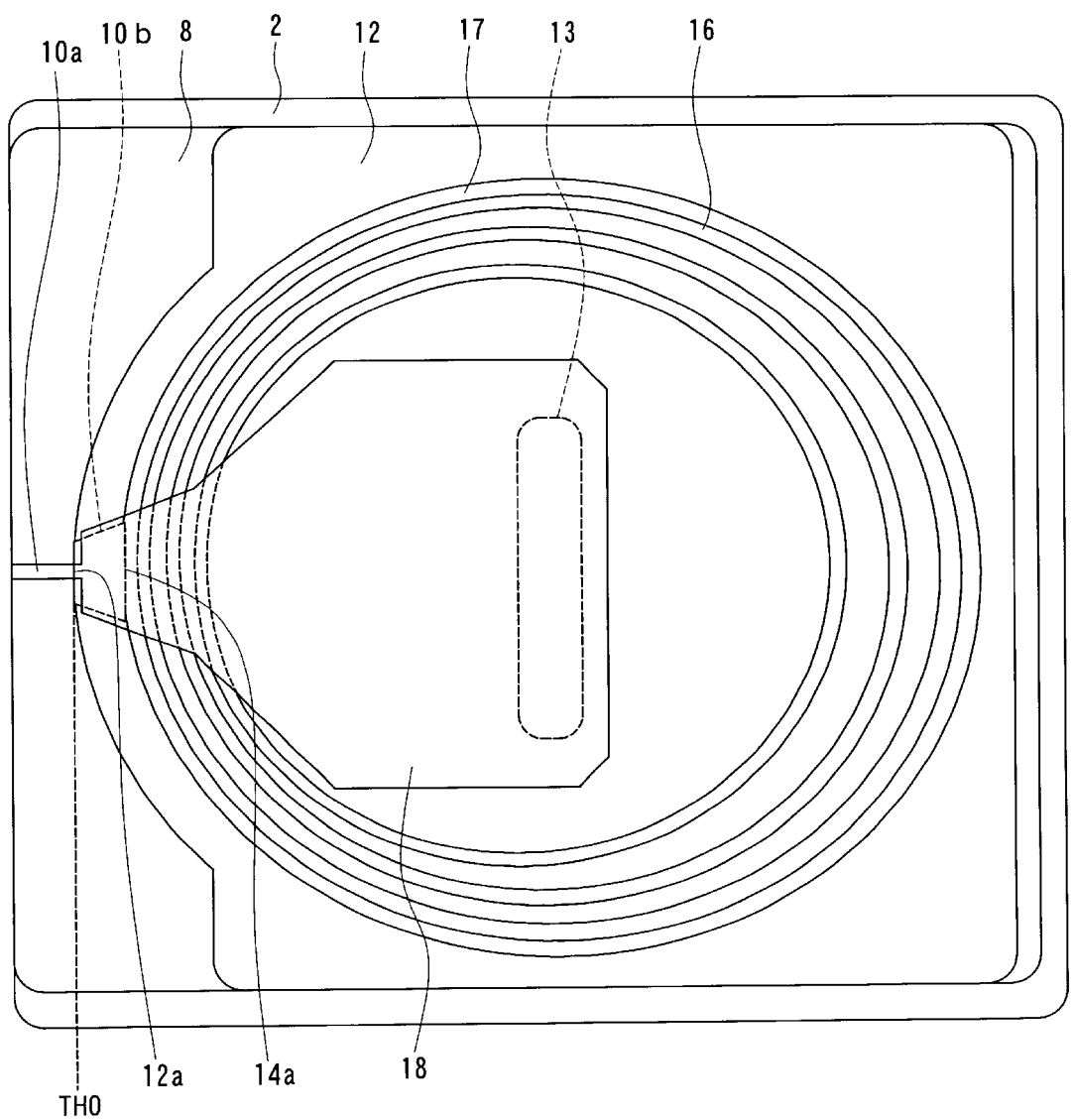
FIG. 8 is a top view of the thin-film magnetic head of the first embodiment.

FIG. 8 is a top view of the thin-film magnetic head of the embodiment, wherein the overcoat layer 20 is omitted and some of the other insulating layers and insulating films are omitted. In FIG. 8 'THO' indicates the zero throat height position.

As described so far, the thin-film magnetic head of the embodiment comprises the reproducing head and the recording head (the induction-type magnetic transducer). The reproducing head has: the MR element 5; and the bottom shield layer 3 and the top shield layer (bottom pole layer 8) for shielding the MR element 5. Portions of the bottom shield layer 3 and the top shield layer on a side of the medium facing surface (the air bearing surface 30) facing toward a recording medium are opposed to each other, the MR element 5 being placed between the portions.

The recording head has the bottom pole layer 8 and the top pole layer (including the first pole portion layer 10a, the second pole portion layer 10b, the magnetic layers 11 and 13 and the yoke portion layer 18) magnetically coupled to each other, each of which includes at least one layer. The bottom pole layer 8 and the top pole layer include pole portions opposed to each other and placed in regions on a side of the medium facing surface. The recording head further has: the recording gap layer 9 placed between the pole portion of the bottom pole layer 8 and the pole portion of the top pole layer; and the thin-film coil 16 at least a part of which is placed between the two pole layers, the at least part of the coil being insulated from the two pole layers.

In the embodiment the top pole layer has: the first pole portion layer 10a, the second pole portion layer 10b, and the yoke portion layer 18. The first pole portion layer 10a forms a part of the pole portion and has a width equal to the recording track width and a length equal to the throat height. One of the surfaces of the first pole portion layer 10a is adjacent to the recording gap layer 9. The second pole portion layer 10b includes a portion to be the other part of the pole portion. One of the surfaces of the second pole portion layer 10b touches the other surface of the first pole portion layer 10a. The width of a portion of the second pole portion layer 10b touching the first pole portion layer 10a is equal to the width of the first pole portion layer 10a, that is, the recording track width. The entire length of the second pole portion layer 10b is greater than the length of the first pole portion layer 10a. The yoke portion layer 18 is connected to the other surface of the second pole portion layer 10b and forms the yoke portion. Therefore, according to the embodiment, the throat height is defined by the first pole portion layer 10a of the top pole layer. The recording track width is defined by the first pole portion layer 10a and the second pole portion layer 10b of the top pole layer.

In this embodiment the insulating layer encasing portion 50 (as shown in FIG. 4A) is formed between the recording gap layer 9 and a portion of a surface of the second pole portion layer 10b that does not touch the top surface of the first pole portion layer 10a. The insulating layer 12 for defining the throat height is placed in the encasing portion 50. The zero throat height position is the position of the end 50a of the encasing portion 50 on a side of the air bearing surface.

In the embodiment the coil encasing portion 14 (as shown in FIG. 4A) is formed such that the encasing portion 14 has a depth that extends from the level of the recording gap layer 9 to the bottom pole layer 8 and to the top pole layer (the pole portion layers 10a and 10b). The thin-film coil 16 is placed in the coil encasing portion 14. In the embodiment, in particular, the coil 16 is placed in the coil encasing portion 14 such that the coil 16 extends from the level of the recording gap layer 9 to the bottom pole layer 8 and toward the top pole layer. The end 14a of the coil encasing portion 14 closer to the air bearing surface 30 than the other end is located farther from the air bearing surface 30 than the end 50a of the insulating layer encasing portion 50 on a side of the air bearing surface 30, that is, than the zero throat height position.

According to the embodiment, the coil encasing portion 14 is formed such that the encasing portion 14 has a depth that extends from the level of the recording gap layer 9 to the bottom pole layer 8 and to the top pole layer. The thin-film coil 16 is placed in the coil encasing portion 14. As a result, it is possible to increase the thickness of the coil 16 and to reduce the resistance thereof, compared to the case where the coil is placed on one side of the recording gap layer. The thickness of the coil 16 is particularly increased if the coil 16 is placed in the coil encasing portion 14 such that the coil 16 extends from the level of the recording gap layer 9 toward the bottom pole layer 8 and toward the top pole layer. Therefore, according to the embodiment, it is possible to reduce the line width of the coil 16. In addition, it is possible that an end of the coil 16 facing toward the air bearing surface 30 is placed near an end of the coil encasing portion 14 closer to the air bearing surface 30 than the other end, according to the embodiment. In the embodiment the thin-film coil 16 is formed on the flat insulating film 15. It is thereby possible to form the thin-film coil 16 of small dimensions with accuracy. As thus described, according to the embodiment, the yoke length is reduced by about 30 to 40 percent of that of a prior-art head, for example.

According to the embodiment, it is possible to form the top pole layer of small dimensions with accuracy since no apex exists. A reduction in the track width of the recording head (induction-type magnetic transducer) is thereby achieved. In the embodiment, in particular, the yoke portion layer 18 of the top pole layer is made flat. It is thereby possible to precisely control the composition of the yoke portion layer 18 and to obtain the performance characteristics of the recording head with stability when the thin-film magnetic heads are mass-produced.

If a yoke portion layer is connected to a pole portion having a width equal to the recording track width and a length equal to the throat height, the cross-sectional area of the magnetic path abruptly decreases in the portion connecting the yoke portion layer to the pole portion. As a result, a magnetic flux may be saturated in this portion. This problem more frequently occurs when the throat height is small.

According to the embodiment, in contrast, the end 14a of the coil encasing portion 14 closer to the air bearing surface 30 than the other end is located farther from the air bearing surface 30 than the end 50a of the insulating layer encasing portion 50 on a side of the air bearing surface 30, that is, than the zero throat height position. As a result, relatively wide areas of the pole portion (the second pole portion layer 10b) and the yoke portion layer 18 are in contact and connected with each other in a region farther from the air bearing surface 30 than the zero throat height position. Therefore, according to the embodiment, it is impossible that the cross-sectional area of the magnetic path abruptly decreases in the portion connecting the yoke portion layer 18 to the first pole portion layer 10a. As a result, saturation of a magnetic flux halfway through the magnetic path is prevented. According to the embodiment, it is thereby possible to utilize the magnetomotive force generated by the thin-film coil 16 for writing with efficiency.

As thus described, according to the embodiment, it is possible to provide a thin-film magnetic head having a recording head with an excellent high frequency characteristic, an excellent nonlinear transition shift (NLTS) characteristic and an excellent overwrite property that is a parameter indicating one of characteristics when data is written over existing data.

In this embodiment the first pole portion layer 10a finally has a length equal to the throat height and a width equal to the recording track width. However, the first pole portion layer 10a is first formed to have a width greater than the recording track width. The second pole portion layer 10b having a width equal to the recording track width is then formed, which is followed by etching of the first pole portion layer 10a with the second pole portion layer 10b as a mask. The width of the first pole portion layer 10a is thereby made equal to the recording track width. As thus described, according to the embodiment, the first pole portion layer 10a is first formed to have a width greater than the recording track width. As a result, the first pole portion layer 10a is formed with more accuracy without pattern edges being rounded, compared to the case where the pole portion originally has a width equal to the recording track width and a length equal to the throat height. Furthermore, according to the embodiment, the first pole portion layer 10a is formed on the flat surface. The first pole portion layer 10a is thus formed with further accuracy in this respect, too. Therefore, the throat height is defined with accuracy even when the track width is reduced.

According to the embodiment, the second pole portion layer 10b is formed such that: the width of the portion of the second pole portion layer 10b touching the first pole portion layer 10a is equal to the recording track width; and the entire length of the second pole portion layer 10b is greater than the length of the first pole portion layer 10a. Therefore, the second pole portion layer 10b is formed with more accuracy, compared to the case where the pole portion has a width equal to the recording track width and a length equal to the throat height. Furthermore, according to the embodiment, the second pole portion layer 10b is formed on the first pole portion layer 10a and the insulating layer 12 whose top surfaces are flattened. The second pole portion layer 10b is thus formed with further accuracy in this respect, too. Therefore, according to the embodiment, the track width is defined with accuracy even when the track width is reduced.

In this embodiment the end face of the yoke portion layer 18 facing toward the air bearing surface 30 is located at a distance from the air bearing surface 30. As a result, the embodiment prevents 'side write', that is, writing of data in a region of a recording medium where data is not supposed to be written. In the embodiment the first pole portion layer 10a is connected to the yoke portion layer 18 through the second pole portion layer 10b whose entire length is greater than the throat height. Therefore, it is impossible that the cross-sectional area of the magnetic path abruptly decreases even though the end face of the yoke portion layer 18 facing toward the air bearing surface 30 is located at a distance from the air bearing surface 30 as described above.

According to the embodiment, the insulating layer 17 is provided to cover the thin-film coil 16 placed in the coil encasing portion 14. The top surface of the insulating layer 17 is flattened. It is therefore possible to form the yoke portion layer 18 with accuracy in the following step.

According to the embodiment, the insulating film 15 is provided between the bottom pole layer 8 and the thin-film coil 16. The insulating film 15 is a thin insulating film made of an inorganic material that achieves sufficient insulation strength. High insulation strength is thereby obtained between the bottom pole layer 8 and the coil 16.

In the embodiment the thin-film coil 16 is covered with the insulating layer 17 made of an inorganic insulation material. It is thereby possible to prevent the pole portion from protruding toward a recording medium due to expansion resulting from heat generated around the coil 16 when the thin-film magnetic head is used.

Second Embodiment

Figures 9A, 9B:
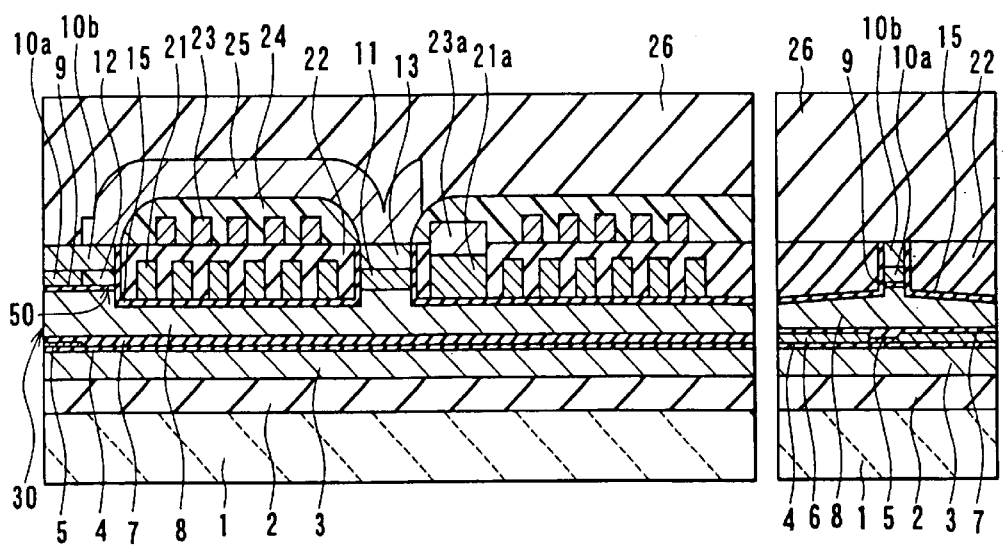
FIG. 9A and FIG. 9B are cross sections of a thin-film magnetic head of a second embodiment of the invention.
Figure 10:
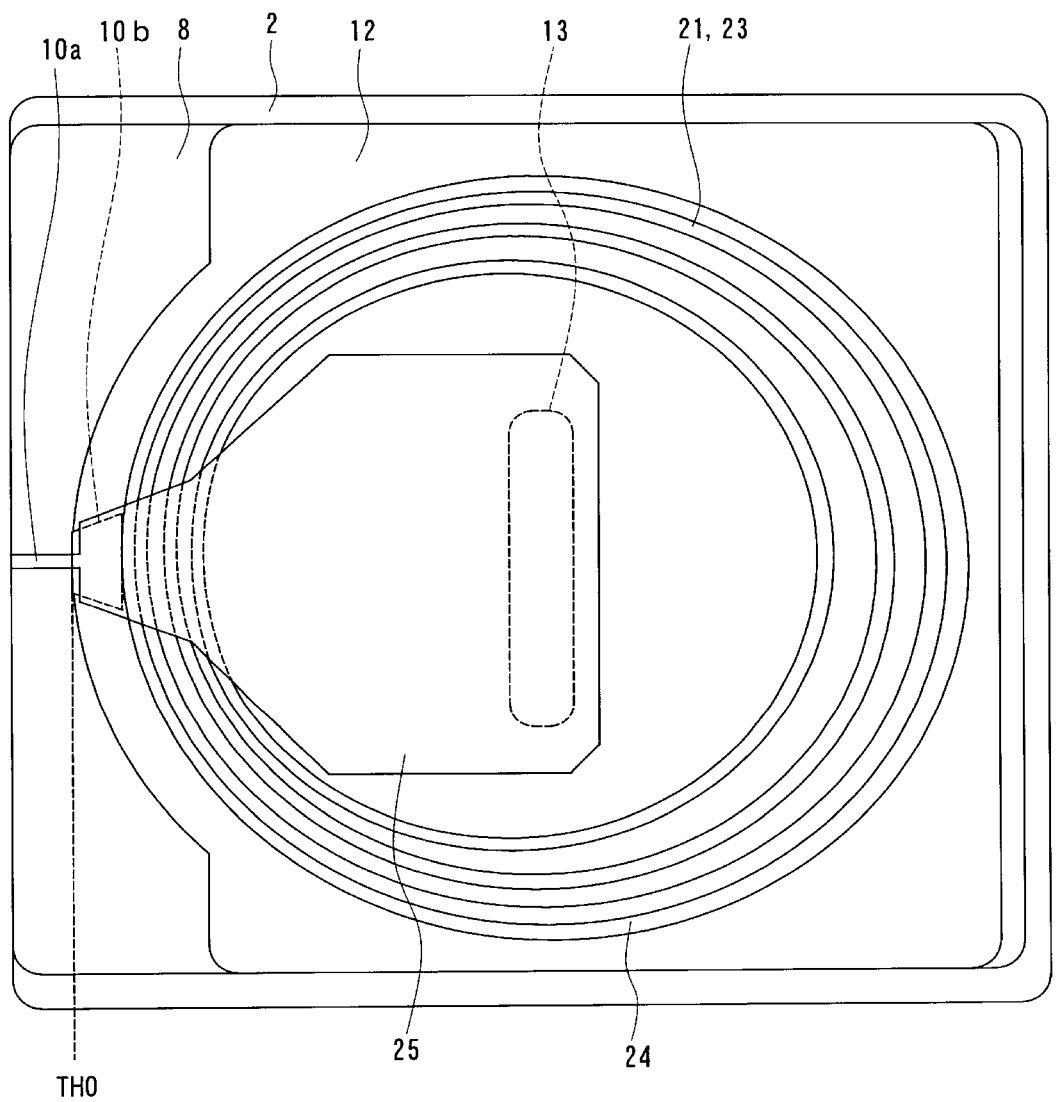
FIG. 10 is a top view of the thin-film magnetic head of the second embodiment.

Reference is now made to FIG. 9A, FIG. 9B and FIG. 10 to describe a thin-film magnetic head and a method of manufacturing the same of a second embodiment of the invention. FIG. 9A is a cross section orthogonal to an air bearing surface. FIG. 9B is a cross section of a pole portion parallel to the air bearing surface.

A two-layer thin-film coil is provided in the thin-film magnetic head of the second embodiment. As shown in FIG. 9A and FIG. 9B, the head of this embodiment has a first layer 21 of the coil in place of the coil 16 of the first embodiment, and an insulating layer 22 in place of the insulating layer 17 of the first embodiment. In FIG. 9A numeral 21a indicates a portion for connecting the first layer 21 to a second layer of the coil described later. The steps of the method of manufacturing the thin-film magnetic head of the second embodiment that are taken until the insulating layer 22 is flattened are similar to those of the first embodiment that are taken until the insulating layer 17 is flattened.

In the following step of the method of the second embodiment, a portion of the insulating layer 22 located on the connection portion 21a is etched to form a contact hole. Next, the second layer 23 of the thin-film coil made of copper, for example, is formed by a method such as frame plating on the insulating layer 22. For example, the thickness of the second layer 23 is about 1.0 to 2.0 μm and the pitch is 1.2 to 2.0 μm. In FIG. 9A numeral 23a indicates a portion for connecting the second layer 23 to the connection portion 21a of the first layer 21 of the coil through the contact hole.

Next, a photoresist layer 24 is formed into a specific pattern on the insulating layer 22 and the second layer 23 of the coil. Next, a yoke portion layer 25 having a thickness of about 2.0 to 3.0 μm, for example, is formed to be a yoke portion of the top pole layer on the second pole portion layer 10b, the photoresist layer 24 and the magnetic layer 13. The yoke portion layer 25 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used. To improve the high frequency characteristic, the yoke portion layer 25 may be made of a number of layers of inorganic insulating films and magnetic layers of Permalloy, for example.

An end face of the yoke portion layer 25 on a side of the air bearing surface 30 is located at a distance of only 0.5 to 1.0 μm, for example, from the air bearing surface 30. In this embodiment, in particular, the end face of the yoke portion layer 25 is located near the zero throat height position.

Next, an overcoat layer 26 of alumina, for example, having a thickness of 20 to 40 μm, for example, is formed over the entire surface. The surface of the overcoat layer 26 is then flattened and pads (not shown) for electrodes are formed on the overcoat layer 26. Finally, lapping of the slider is performed to form the air bearing surfaces 30 of the thin-film magnetic head including the recording head and the reproducing head. The thin-film magnetic head of the embodiment is thus completed.

FIG. 10 is a top view of the thin-film magnetic head of the embodiment, wherein the overcoat layer 26 is omitted and some of the other insulating layers and insulating films are omitted.

In this embodiment the top pole layer made up of the first pole portion layer 10a, the second pole portion layer 10b, the magnetic layers 11 and 13 and the yoke portion layer 25 corresponds to the second magnetic layer of the invention.

In this embodiment the second layer 23 of the thin-film coil is formed on the flattened insulating layer 22. It is thereby possible to form the second layer 23 of small dimensions with accuracy.

Although the apex exists in the head of this embodiment, the first layer 21 of the coil is placed in the coil encasing portion having a depth that extends from the level of the recording gap layer 9 to the bottom pole layer 8 and to the top pole layer. The height of the apex is therefore lower than that of a head having a two-layer coil located on one side of the recording gap layer 9. As a result, according to the embodiment, it is possible to form the yoke portion layer 25 of the top pole layer having small dimensions with accuracy.

The remainder of the configuration, functions and effects of the embodiment are similar to those of the first embodiment.

Third Embodiment

Reference is now made to FIG. 11A to FIG. 15A, FIG. 11B to FIG. 15B, and FIG. 16 to describe a thin-film magnetic head and a method of manufacturing the same of a third embodiment of the invention. FIG. 11A to FIG. 15A are cross sections orthogonal to an air bearing surface. FIG. 11B to FIG. 15B are cross sections of a pole portion parallel to the air bearing surface.

The thin-film magnetic head of the third embodiment is formed such that the throat height is defined on a side of the bottom pole layer. The steps of the method of manufacturing the thin-film magnetic head of this embodiment that are taken until the bottom pole layer 8 is formed are similar to those of the first embodiment.

Figures 11A, 11B:
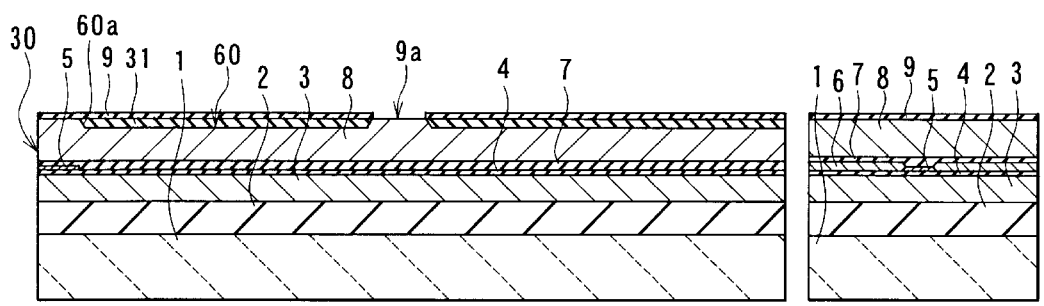
FIG. 11A and FIG. 11B are cross sections for illustrating a step in a method of manufacturing a thin-film magnetic head of a third embodiment of the invention.

In the following step of the third embodiment, as shown in FIG. 11A and FIG. 11B, a region where a thin-film coil described later is formed in a top surface of the bottom pole layer 8 is selectively etched by about 0.5 to 1.0 μm, for example, through a technique such as ion milling with a photoresist film as a mask. A first concavity 60 is thereby formed in the top surface of the bottom pole layer 8.

Next, an insulating layer 31 made of alumina, for example, having a thickness of about 3 to 5 μm is formed over the entire surface. The insulating layer 31 is then polished through CMP, for example, until the bottom pole layer 8 is exposed, and the surface is flattened. Through this flattening of the insulating layer 31, the depth of the first concavity 60 is made approximately 0.3 to 0.7 μm. In FIG. 11A the zero throat height position is the position of an end 60a of the first concavity 60 on a side of the air bearing surface 30. The insulating layer 31 placed in the first concavity 60 corresponds to the insulating layer for defining the throat height of the invention.

Next, the recording gap layer 9 made of an insulating material whose thickness is 0.3 µm, for example, is formed on the bottom pole layer 8 and the insulating layer 31. Next, a portion of the recording gap layer 9 located in a region corresponding to a center portion of the thin-film coil described later is etched to form the contact hole 9a for making the magnetic path.

Figures 12A, 12B:
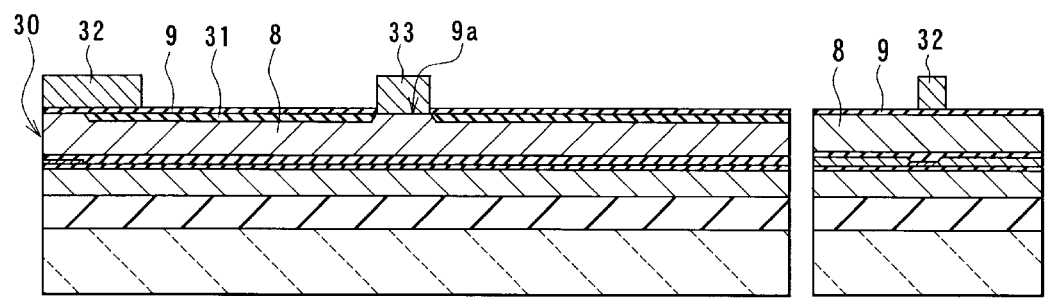
FIG. 12A and FIG. 12B are cross sections for illustrating a step that follows FIG. 1A and FIG. 1B.

Next, as shown in FIG. 12A and FIG. 12B, a pole portion layer 32 to be a pole portion of the top pole layer is formed on the recording gap layer 9 near an end thereof on a side of the air bearing surface 30. The pole portion layer 32 is made of a magnetic material and has a thickness of about 2 to 3 µm, for example. At the same time, a magnetic layer 33 for making the magnetic path is formed in the contact hole 9a for making the magnetic path. The magnetic layer 33 is made of a magnetic material and has a thickness of about 2 to 3 µm, for example. The pole portion layer 32 has a width equal to the recording track width and a length greater than the throat height.

The pole portion layer 32 may be made of NiFe (80 weight % Ni and 20 weight % Fe), or NiFe (45 weight % Hi and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used.

Next, as shown in FIG. 13A and FIG. 13B, the recording gap layer 9 is selectively etched through dry etching, using the pole portion layer 32 and the magnetic layer 33 as masks. The dry etching may be reactive ion etching (RIE) using a chlorine-base gas such as $BCl_2$ or $Cl_2$, or a fluorine-base gas such as $CF_4$ or $SF_6$, for example.

Next, the bottom pole layer 8 is selectively etched by about 0.3 to 0.6 µm with the pole portion layer 32 and the magnetic layer 33 as masks through ion milling using an argon-base gas, for example. The trim structure as shown in FIG. 13B is thus formed. Alternatively, a photomask (not shown) for trimming may be formed on a portion other than the region where etching is required before etching the recording gap layer 9 and the bottom pole layer 8.

In this embodiment, when the bottom pole layer 8 is etched as described above, a second concavity 62 is formed in the top surface of the bottom pole layer 8 in the region where the thin-film coil described later is to be formed, as shown in FIG. 13A. A coil encasing portion 63 is thus formed. The coil encasing portion 63 has a depth that extends from the level of the recording gap layer 9 toward the bottom pole layer 8 and toward the top pole layer (the pole portion layer 32). An insulating layer encasing portion 61 of this embodiment is the portion in which a portion of the insulating layer 31 left after the bottom pole layer 8 is etched is placed. The zero throat height position is the position of an end 61a of the encasing portion 61 on a side of the air bearing surface 30 (that is, the position of the end 60a of the first concavity 60 on a side of the air bearing surface 30).

An end 63a of the coil encasing portion 63 closer to the air bearing surface 30 than the other end is located farther from the air bearing surface 30 than the end 61a of the insulating layer encasing portion 61 on the side of the air bearing surface 30, that is, than the zero throat height position. The distance between the air bearing surface 30 and the end 63a is equal to the distance between the air bearing surface 30 and an end of the pole portion layer 32 opposite to the air bearing surface 30.

If the bottom pole layer 8 is etched through ion milling, for example, no obstacle that interrupts beams of ion milling exists, such as the pole portion layer 32 of the top pole layer, in the region where the coil encasing portion 63 is to be formed in the top surface of the bottom pole layer 8. Consequently, the etching rate of the bottom pole layer 8 is higher in the region where the coil encasing portion 63 is to be formed, than in the region around the pole portion layer 32. Therefore, if the region of the bottom pole layer 8 around the pole portion layer 32 is etched by about 0.3 to 0.6 µm, the region where the coil encasing portion 63 is to be formed is etched by about 0.6 to 1.5 µm, for example. The depth of the coil encasing portion 63 from the top surface of the bottom pole layer 8 is therefore about 0.6 to 1.5 µm, for example. The depth of the coil encasing portion 63 is made greater than that of the insulating layer encasing portion 61.

Next, an insulating film 34 of alumina, for example, having a thickness of about 0.3 to 0.6 µm is formed over the entire surface. The insulating film 34 is provided for insulating the thin-film coil described later from the bottom pole layer 8. Next, the thin-film coil 35 made of copper, for example, is formed by a method such as frame plating on the insulating film 34 in the coil encasing portion 63. For example, the thickness of the coil 35 is about 1.0 to 2.0 µm and the pitch is 1.2 to 2.0 µm. The coil 35 is wound around the magnetic layer 33. In FIG. 13A numeral 35a indicates a portion for connecting the coil 35 to a conductive layer (lead) described later.

Next, as shown in FIG. 14A and FIG. 14B, an insulating layer 36 of alumina, for example, having a thickness of about 3 to 4 µm is formed over the entire surface. The insulating layer 36 is then polished through CMP, for example, so that the pole portion layer 32 and the magnetic layer 33 are exposed, and the surface is flattened. Although the coil 35 is not exposed in FIG. 14A, the coil 35 may be exposed. If the coil 35 is exposed, an insulating film is formed to cover the coil 35.

Figures 15A, 15B:
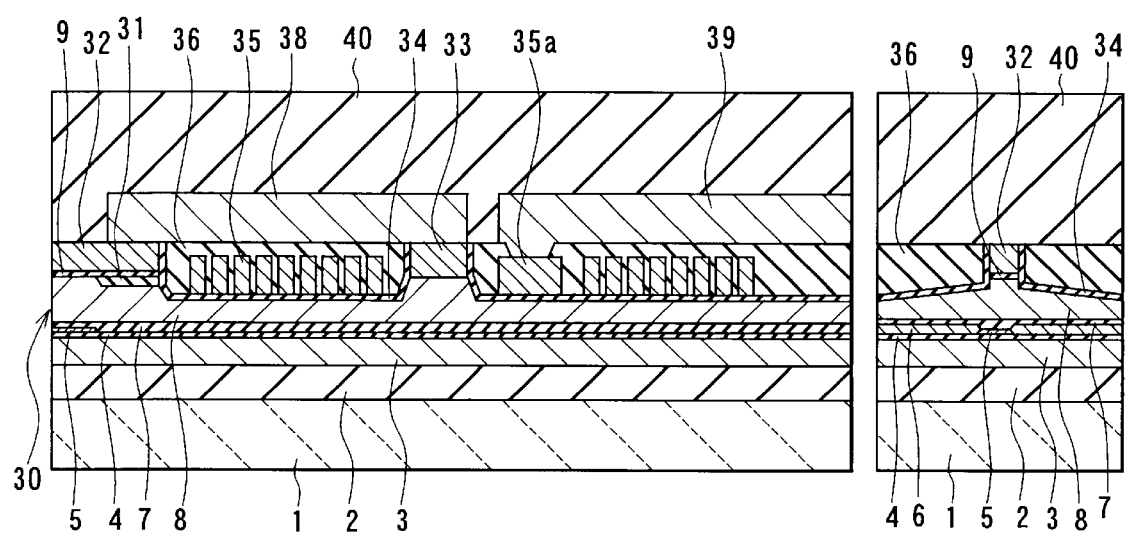
FIG. 15A and FIG. 15B are cross sections of the thin-film magnetic head of the third embodiment.

Next, as shown in FIG. 15A and FIG. 15B, a portion of the insulating layer 36 located on the connection portion 35a is etched to form a contact hole. Next, the yoke portion layer 38 having a thickness of about 2.0 to 3.0 µm, for example, is formed to be a yoke portion of the top pole layer on the pole portion layer 32, the insulating layer 36 and the magnetic layer 33. At the same time, the conductive layer 39 having a thickness of about 2.0 to 3.0 µm, for example, is formed. The conductive layer 39 is connected to the connection portion 35a. The yoke portion layer 38 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used. To improve the high frequency characteristic, the yoke portion layer 38 may be made of a number of layers of inorganic insulating films and magnetic layers of Permalloy, for example.

An end face of the yoke portion layer 38 on a side of the air bearing surface 30 is located at a distance of only 0.5 to 1.0 µm, for example, from the air bearing surface 30. In this embodiment, in particular, the end face of the yoke portion layer 38 is located near the zero throat height position.

Next, an overcoat layer 40 of alumina, for example, having a thickness of 20 to 40 μm, for example, is formed over the entire surface. The surface of the overcoat layer 40 is then flattened and pads (not shown) for electrodes are formed on the overcoat layer 40. Finally, lapping of the slider is performed to form the air bearing surfaces 30 of the thin-film magnetic head including the recording head and the reproducing head. The thin-film magnetic head of the embodiment is thus completed.

In this embodiment the top pole layer made up of the pole portion layer 32, the magnetic layer 33 and the yoke portion layer 38 corresponds to the second magnetic layer of the invention.

Figure 16:
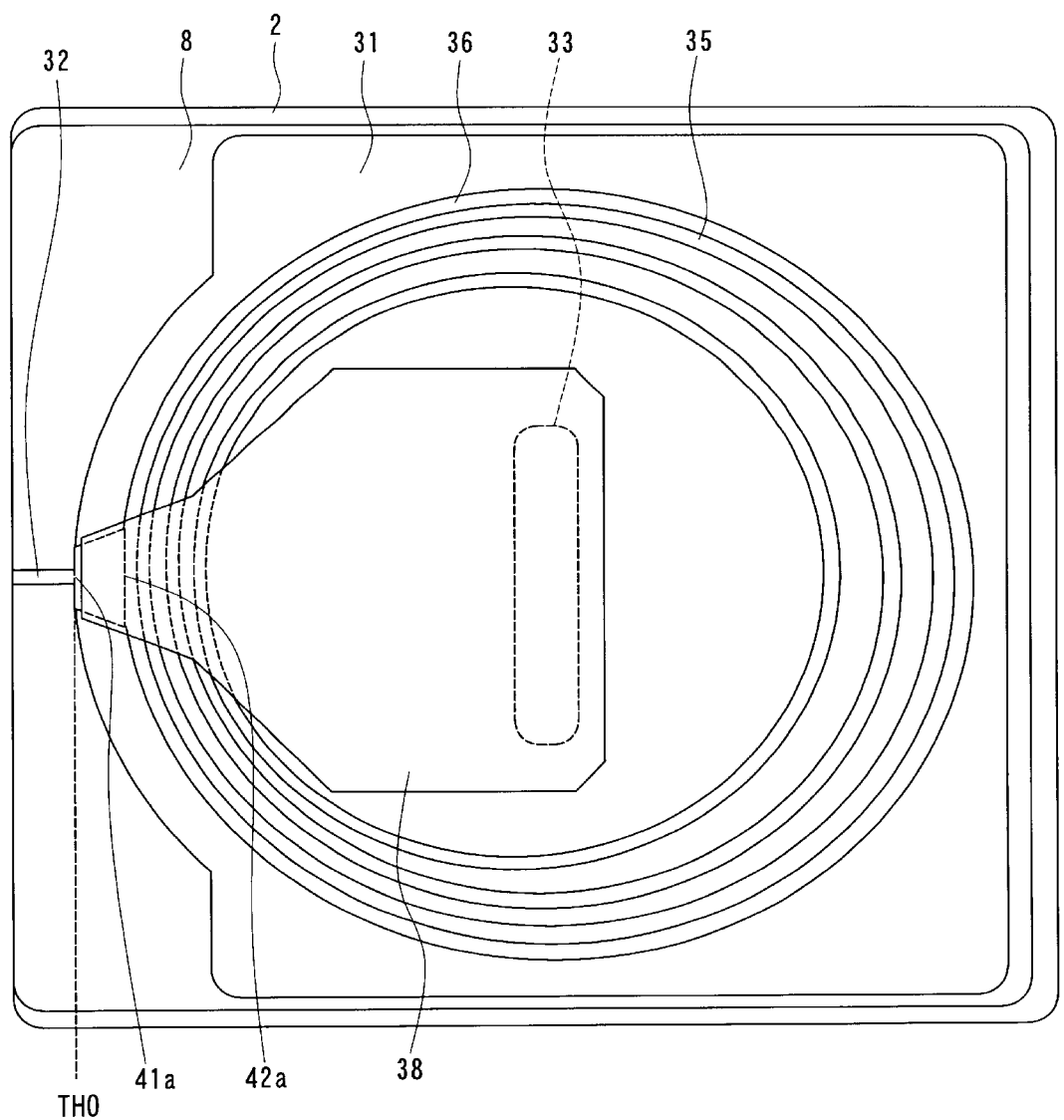
FIG. 16 is a top view of the thin-film magnetic head of the third embodiment.

FIG. 16 is a top view of the thin-film magnetic head of the embodiment, wherein the overcoat layer 40 is omitted and some of the other insulating layers and insulating films are omitted.

In this embodiment the insulating layer encasing portion 61 (as shown in FIG. 13A) is formed in the top surface of the bottom pole layer 8. The insulating layer 31 for defining the throat height is placed in the encasing portion 61. The zero throat height position is the position of the end 61a of the encasing portion 61 on a side of the air bearing surface.

In the embodiment the coil encasing portion 63 (as shown in FIG. 13A) is formed such that the encasing portion 63 has a depth that extends from the level of the recording gap layer 9 to the bottom pole layer 8 and to the top pole layer (the pole portion layer 32). The thin-film coil 35 is placed in the coil encasing portion 63. The end 63a of the coil encasing portion 63 closer to the air bearing surface 30 than the other end is located farther from the air bearing surface 30 than the end 61a of the insulating layer encasing portion 61 on a side of the air bearing surface 30, that is, than the zero throat height position.

If a concavity is formed in the bottom pole layer 8 for encasing the thin-film coil and the position of an end of this concavity on a side of the air bearing surface 30 is defined as the zero throat height position, the cross-sectional area of the magnetic path abruptly decreases in the bottom pole layer 8 in the portion connecting a portion of the pole portion closer to the air bearing surface 30 than the zero throat height position to the yoke portion below the thin-film coil. As a result, a magnetic flux may be saturated in this connecting portion. This problem more frequently occurs when the throat height is small.

According to the embodiment, in contrast, the end 63a of the coil encasing portion 63 closer to the air bearing surface 30 than the other end is located farther from the air bearing surface 30 than the end 61a of the insulating layer encasing portion 61 on a side of the air bearing surface 30, that is, than the zero throat height position. In addition, the depth of the encasing portion 61 is greater than that of the encasing portion 63. Therefore, according to the embodiment, it is impossible that the cross-sectional area of the magnetic path abruptly decreases in the portion connecting the yoke portion to the pole portion in the bottom pole layer 8. As a result, saturation of a magnetic flux halfway through the magnetic path is prevented. According to the embodiment, it is thereby possible to utilize the magnetomotive force generated by the thin-film coil 35 for writing with efficiency.

In this embodiment it is possible to form the insulating layer encasing portion 61 for defining the throat height in a relatively large area through photolithography. It is therefore possible to define the throat height with more accuracy, compared to the case where the throat height is defined by the pole portion of the top pole layer.

According to the embodiment, a surface of the insulating layer 31 facing toward the recording gap layer 9 is flattened, together with a surface of the bottom pole layer 8 facing toward the recording gap layer 9. It is thereby possible to form the recording gap layer 9 and the pole portion layer 32 of the top pole layer on the insulating layer 31 with accuracy.

The remainder of the configuration, functions and effects of the embodiment are similar to those of the first embodiment except the functions and effects pertinent to the structure of the top pole layer of the first embodiment.

Fourth Embodiment

Figure 17A:
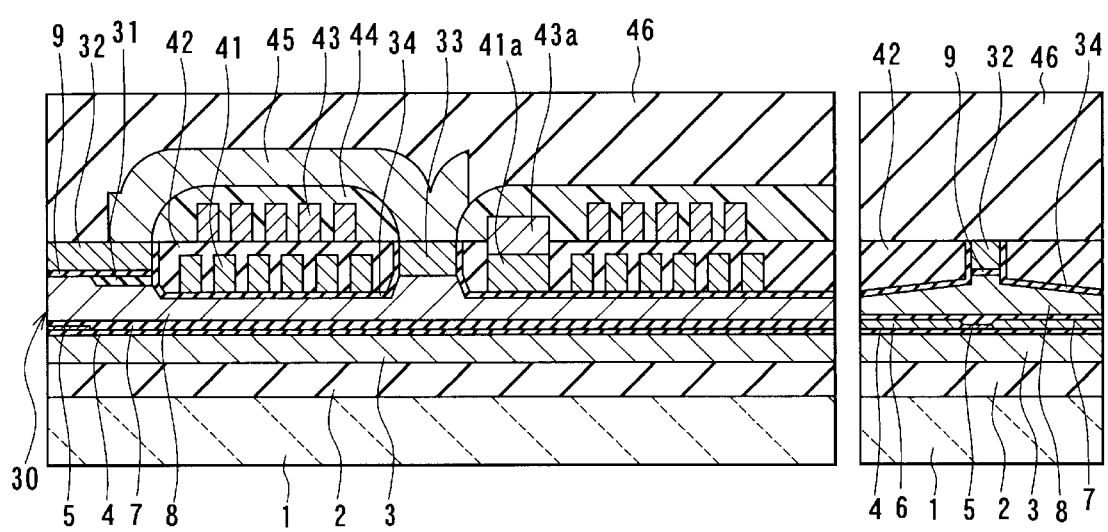
FIG. 17A and FIG. 17B are cross sections of a thin-film magnetic head of a fourth embodiment of the invention.
Figure 17B:
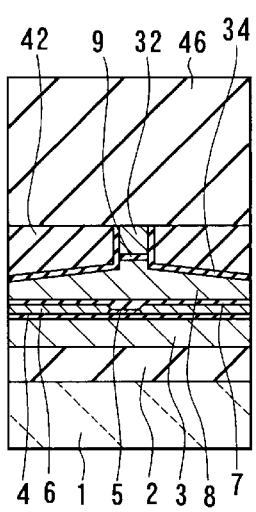
Figure 18:
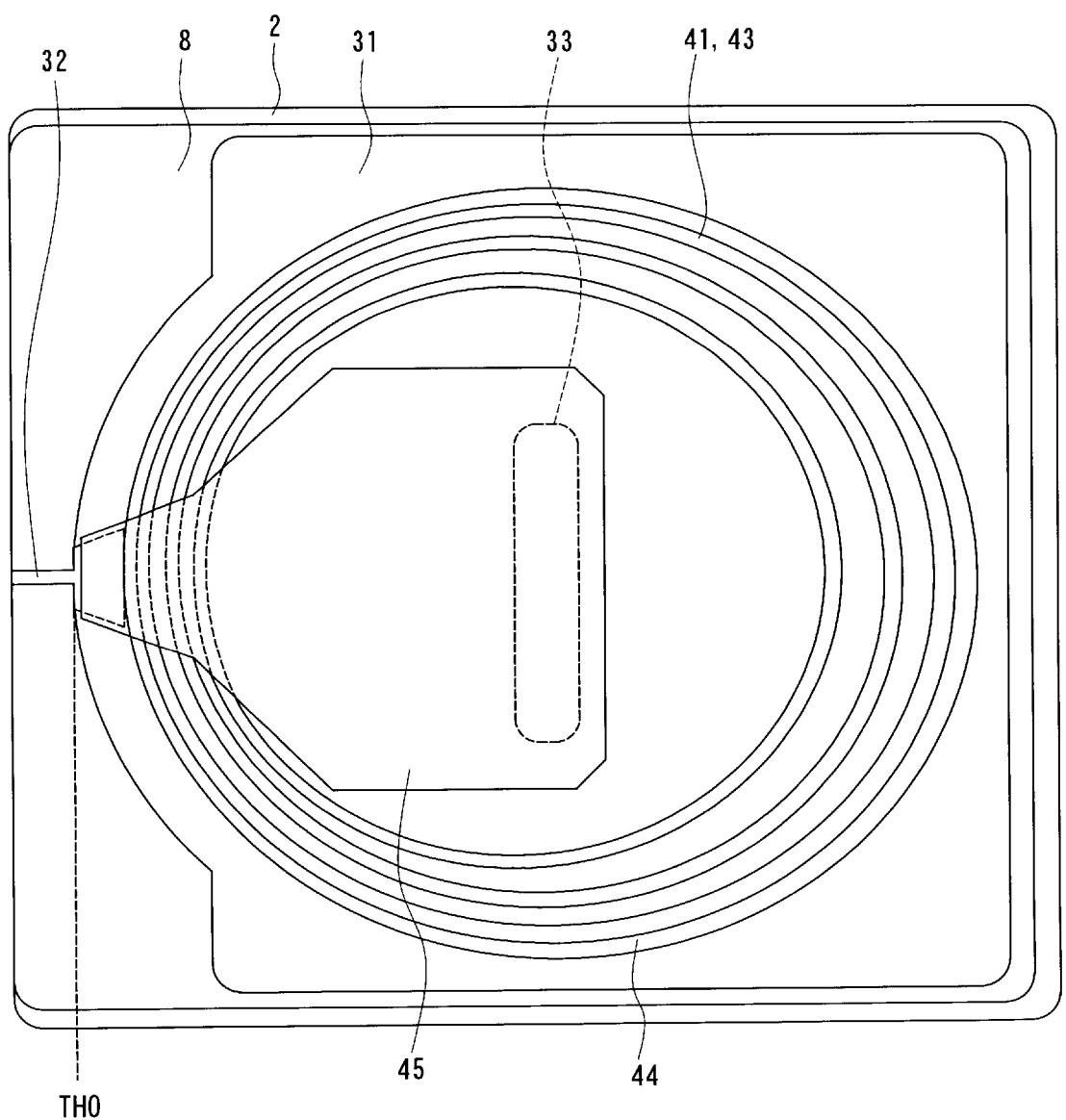
FIG. 18 is a top view of the thin-film magnetic head of the fourth embodiment.
Figures 21A, 21B:
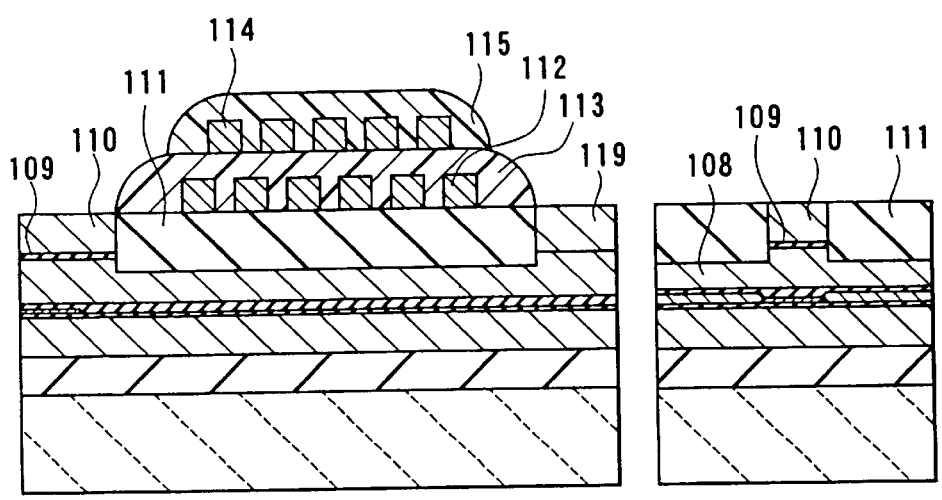
FIG. 21A and FIG. 21B are cross sections for illustrating a step that follows FIG. 20A and FIG. 20B.
Figures 22A, 22B:
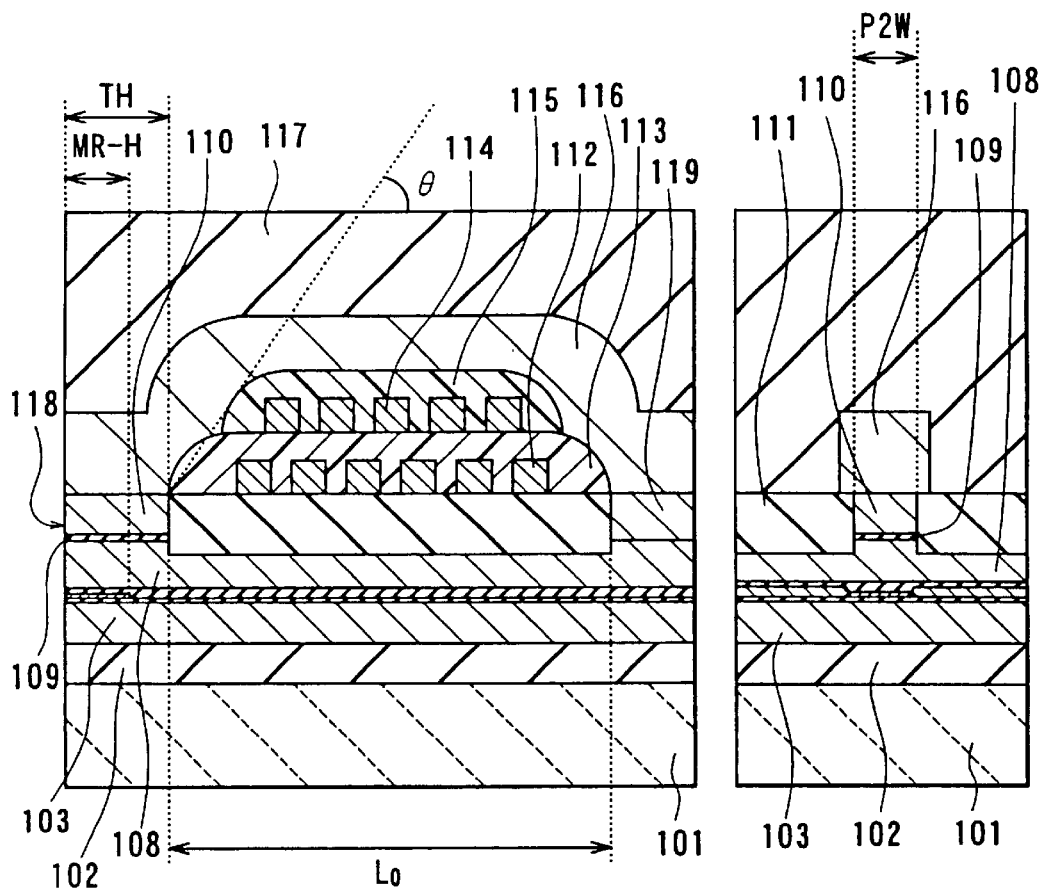
FIG. 22A and FIG. 22B are cross sections for illustrating a step that follows FIG. 21A and FIG. 21B.
Figure 23:
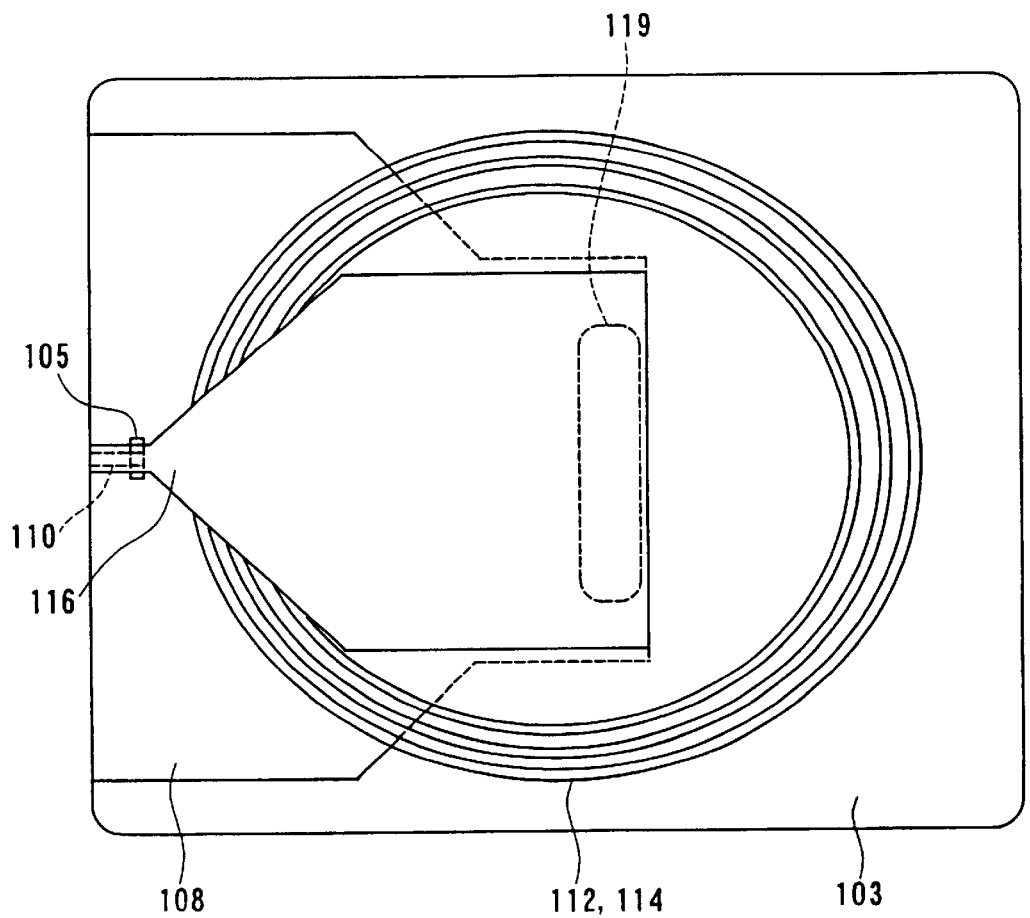
FIG. 23 is a top view of the related-art thin-film magnetic head.

Reference is now made to FIG. 17A, FIG. 17B and FIG. 18 to describe a thin-film magnetic head and a method of manufacturing the same of a fourth embodiment of the invention. FIG. 17A is a cross section orthogonal to an air bearing surface. FIG. 17B is a cross section of a pole portion parallel to the air bearing surface.

A two-layer thin-film coil is provided in the thin-film magnetic head of the fourth embodiment. As shown in FIG. 17A and FIG. 17B, the head of this embodiment has a first layer 41 of the thin-film coil in place of the coil 35 of the third embodiment, and an insulating layer 42 in place of the insulating layer 36 of the third embodiment. In FIG. 17A numeral 41a indicates a portion for connecting the first layer 41 to a second layer of the coil described later. The steps of the method of manufacturing the thin-film magnetic head of the fourth embodiment that are taken until the insulating layer 42 is flattened are similar to those of the third embodiment that are taken until the insulating layer 36 is flattened.

In the following step of the method of the fourth embodiment, a portion of the insulating layer 42 located on the connection portion 41a is etched to form a contact hole. Next, the second layer 43 of the thin-film coil made of copper, for example, is formed by a method such as frame plating on the insulating layer 42. For example, the thickness of the second layer 43 is about 1.0 to 2.0 μm and the pitch is 1.2 to 2.0 μm. In FIG. 17A numeral 43a indicates a portion for connecting the second layer 43 to the connection portion 41a of the first layer 41 of the coil through the contact hole.

Next, a photoresist layer 44 is formed into a specific pattern on the insulating layer 42 and the second layer 43 of the coil. Next, a yoke portion layer 45 having a thickness of about 2.0 to 3.0 μm, for example, is formed to be a yoke portion of the top pole layer on the pole portion layer 32, the photoresist layer 44 and the magnetic layer 33. The yoke portion layer 45 may be made of NiFe (80 weight % Ni and 20 weight % Fe), or NiFe (45 weight % Ni and 55 weight % Fe) as a high saturation flux density material and formed into a specific pattern through plating or may be made of a material such as FeN or FeZrN as a high saturation flux density material through sputtering and then selectively etched through ion milling, for example, into the specific pattern. Alternatively, a material such as CoFe or a Co-base amorphous material as a high saturation flux density material may be used. To improve the high frequency characteristic, the yoke portion layer 45 may be made of a number of layers of inorganic insulating films and magnetic layers of Permalloy, for example.

An end face of the yoke portion layer 45 on a side of the air bearing surface 30 is located at a distance of only 0.5 to 1.0 μm, for example, from the air bearing surface 30. In this embodiment, in particular, the end face of the yoke portion layer 45 is located near the zero throat height position.

Next, an overcoat layer 46 of alumina, for example, having a thickness of 20 to 40 μm, for example, is formed over the entire surface. The surface of the overcoat layer 46 is then flattened and pads (not shown) for electrodes are formed on the overcoat layer 46. Finally, lapping of the slider is performed to form the air bearing surfaces 30 of the thin-film magnetic head including the recording head and the reproducing head. The thin-film magnetic head of the embodiment is thus completed.

FIG. 18 is a top view of the thin-film magnetic head of the embodiment, wherein the overcoat layer 46 is omitted and some of the other insulating layers and insulating films are omitted.

In this embodiment the top pole layer made up of the pole portion layer 32, the magnetic layer 33 and the yoke portion layer 45 corresponds to the second magnetic layer of the invention.

In this embodiment the second layer 43 of the thin-film coil is formed on the flattened insulating layer 42. It is thereby possible to form the second layer 43 of small dimensions with accuracy. Although the apex exists in the head of this embodiment, the first layer 41 of the coil is placed in the coil encasing portion having a depth that extends from the level of the recording gap layer 9 to the bottom pole layer 8 and to the top pole layer. The height of the apex is therefore lower than that of a head having a two-layer coil located on one side of the recording gap layer 9. As a result, according to the embodiment, it is possible to form the yoke portion layer 45 of the top pole layer having small dimensions with accuracy.

The remainder of the configuration, functions and effects of the embodiment are similar to those of the third embodiment.

The present invention is not limited to the foregoing embodiments but may be practiced in still other ways. In the foregoing embodiments, for example, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head dedicated to writing that has an induction-type magnetic transducer only or to a thin-film magnetic head performing writing and reading through an induction-type magnetic transducer.

According to the thin-film magnetic head or the method of manufacturing the same of the invention described so far, the coil encasing portion is formed, having a depth that extends from the level of the gap layer toward the first magnetic layer and toward the second magnetic layer. At least a part of the coil is placed in the coil encasing portion. As a result, it is possible to increase the thickness of the coil and to reduce the line width thereof, so that the yoke length is reduced. In addition, according to the invention, it is possible that no apex exists or the height of the apex is reduced. It is thereby possible to form one of the magnetic layers of small dimensions with accuracy and to reduce the track width of the induction-type magnetic transducer. Furthermore, according to the invention, the throat height is defined by an end of the insulating layer encasing portion formed in one of the magnetic layers, the end of the encasing portion being on a side of the medium facing surface. In addition, an end of the coil encasing portion on a side of the medium facing surface is located farther from the medium facing surface than the end of the insulating layer encasing portion. It is thereby possible to prevent an abrupt decrease in the cross-sectional area of the magnetic path in the one of the magnetic layers and to prevent a magnetic flux from saturating halfway through the magnetic path.

In the head or the method of the invention, at least a part of the coil placed in the coil encasing portion may be placed such that the at least part of the coil extends from the level of the gap layer toward the first magnetic layer and to the second magnetic layer. In this case, the coil thickness is particularly increased.

In the head or the method of the invention, the second magnetic layer may include: the first pole portion layer for defining the throat height; the second pole portion layer for defining the track width; and the yoke portion layer. In this case, the track width and the throat height of the induction-type magnetic transducer are defined with accuracy even when the track width is reduced.

In the head or the method of the invention, the end face of the yoke portion layer facing toward the medium facing surface may be located at a distance from the medium facing surface. In this case, it is possible to prevent writing of data in a region of the recording medium where data is not supposed to be written.

In the head or the method of the invention, a surface of the insulating layer for defining the throat height that faces the second pole portion layer may be flattened, together with a surface of the first pole portion layer. In this case, the second pole portion layer is formed with further accuracy.

In the head or the method of the invention, an additional insulating layer may be provided. The additional insulating layer covers at least a part of the thin-film coil placed in the coil encasing portion. A surface of the additional insulating layer facing the yoke portion layer is flattened, together with a surface of the second pole portion layer. In this case, it is further possible to form the layer adjacent to the additional insulating layer with accuracy.

According to the head or the method of the invention, the following configuration is possible. The thin-film coil has: the first portion placed in the coil encasing portion; and the second portion located between the first portion and the yoke portion layer. In addition, the head further comprises an additional insulating layer that covers the first portion of the coil placed in the coil encasing portion. A surface of the additional insulating layer facing the yoke portion layer is flattened, together with a surface of the second pole portion layer. In addition, the second portion of the coil is placed between the additional insulating layer and the yoke portion layer. If such a configuration is embodied, it is further possible to form the second portion of the coil with accuracy.

In the head or the method of the invention, the first and second concavities may be provided. The first concavity is formed in a surface of the first magnetic layer facing the gap layer, and provided as the insulating layer encasing portion. The second concavity is formed in a surface of the first magnetic layer facing the gap layer and has a depth greater than that of the first concavity and forms a part of the coil encasing portion. In this case, the throat height is defined with further accuracy.

In the head or the method of the invention, a surface of the insulating layer for defining the throat height that faces the gap layer may be flattened, together with a surface of the first magnetic layer that faces the gap layer. In this case, it is further possible to form the layer adjacent to the insulating layer and the first magnetic layer with accuracy.

In the head or the method of the invention, the second magnetic layer may include the pole portion layer and the yoke portion layer. In addition, an additional insulating layer may be provided. This insulating layer covers at least a part of the thin-film coil placed in the coil encasing portion. A surface of the additional insulating layer facing the yoke portion layer is flattened, together with a surface of the pole portion layer facing the yoke portion layer. In this case, it is further possible to form the layer adjacent to the additional insulating layer with accuracy.

According to the head or the method of the invention, the following configuration is possible. The thin-film coil has: the first portion placed in the coil encasing portion; and the second portion located between the first portion and the yoke portion layer. In addition, the head further comprises an additional insulating layer that covers the first portion of the coil placed in the coil encasing portion. A surface of the additional insulating layer facing the yoke portion layer is flattened, together with a surface of the pole portion layer facing the yoke portion layer. In addition, the second portion of the coil is placed between the additional insulating layer and the yoke portion layer. If such a configuration is embodied, it is further possible to form the second portion of the coil with accuracy.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer having flat top and bottom surfaces and provided between the pole portions of the first and second magnetic layers; and a thin-film coil at least a part of which is placed between the first and second magnetic layers, the at least part of the coil being insulated from the first and second magnetic layers; the head further comprising:

an insulating layer encasing portion formed in one of the magnetic layers and having an end on a side of the medium facing surface, the end of the insulating layer encasing portion defining a throat height, the insulating layer encasing portion being provided for encasing an insulating layer for defining the throat height between the gap layer and the one of the magnetic layers;

the insulating layer for defining the throat height placed in the insulating layer encasing portion; and a coil encasing portion having a depth that extends from a level of the gap layer in the medium facing surface toward the first magnetic layer and toward the second magnetic layer, the coil encasing portion having an end on a side of the medium facing surface located farther from the medium facing surface than the end of the insulating layer encasing portion, the coil encasing portion being provided for encasing the at least part of the coil; wherein the at least part of the coil is placed in the coil encasing portion.

2. The thin-film magnetic head according to claim 1 wherein the at least part of the coil placed in the coil encasing portion is located so as to extend from the level of the gap layer toward the first magnetic layer and toward the second magnetic layer.

3. The thin-film magnetic head according to claim 1 wherein:

the second magnetic layer includes:
a first pole portion layer forming a part of one of the pole portions, having a width equal to a recording track width and a length equal to the throat height, one of surfaces of the first pole portion layer being adjacent to the gap layer;
a second pole portion layer including the other part of the one of the pole portions, a part of one of surfaces of the second pole portion layer touching the other surface of the first pole portion layer, the part of the second pole portion layer touching the first pole portion layer having a width equal to the width of the first pole portion layer, an entire length of the second pole portion layer being greater than the length of the first pole portion layer; and
a yoke portion layer making up a yoke portion and connected to the other surface of the second pole portion layer; and
the insulating layer encasing portion is formed between the gap layer and a part of the one of the surfaces of the second pole portion layer that does not touch the other surface of the first pole portion layer.

4. The thin-film magnetic head according to claim 3 wherein a distance between the medium facing surface and an end of the second pole portion layer opposite to the medium facing surface is equal to a distance between the medium facing surface and the end of the coil encasing portion on the side of the medium facing surface.

5. The thin-film magnetic head according to claim 3 wherein an end face of the yoke portion layer that faces toward the medium facing surface is located at a distance from the medium facing surface.

6. The thin-film magnetic head according to claim 3 wherein a surface of the insulating layer for defining the throat height that faces the second pole portion layer is flattened, together with the other surface of the first pole portion layer.

7. The thin-film magnetic head according to claim 3, further comprising an additional insulating layer that covers the at least part of the coil located in the coil encasing portion and has a surface facing the yoke portion layer, the surface being flattened together with the other surface of the second pole portion layer.

8. The thin-film magnetic head according to claim 3 wherein the thin-film coil includes: a first portion placed in the coil encasing portion; and a second portion located between the first portion and the yoke portion layer.

9. The thin-film magnetic head according to claim 8, further comprising an additional insulating layer that covers the first portion of the coil placed in the coil encasing portion and has a surface facing the yoke portion layer, the surface being flattened together with the other surface of the second pole portion layer, the second portion of the coil being located between the additional insulating layer and the yoke portion layer.

10. The thin-film magnetic head according to claim 1 wherein the first magnetic layer includes: a first concavity formed in a surface of the first magnetic layer facing the gap layer and provided as the insulating layer encasing portion; and a second concavity formed in the surface of the first magnetic layer facing the gap layer, the second concavity having a depth greater than a depth of the first concavity and forming a part of the coil encasing portion.

11. The thin-film magnetic head according to claim 10 wherein a surface of the insulating layer for defining the throat height facing the gap layer is flattened together with the surface of the first magnetic layer facing the gap layer.

12. The thin-film magnetic head according to claim 10 wherein the second magnetic layer includes: a pole portion layer making up one of the pole portions; and a yoke portion layer making up a yoke portion and connected to the pole portion layer.

13. The thin-film magnetic head according to claim 12 wherein a distance between the medium facing surface and an end of the pole portion layer opposite to the medium facing surface is equal to a distance between the medium facing surface and the end of the coil encasing portion on the side of the medium facing surface.

14. The thin-film magnetic head according to claim 12, further comprising an additional insulating layer that covers the at least part of the coil located in the coil encasing portion and has a surface facing the yoke portion layer, the surface being flattened together with a surface of the pole portion layer facing the yoke portion layer.

15. The thin-film magnetic head according to claim 12 wherein the thin-film coil includes: a first portion placed in the coil encasing portion; and a second portion located between the first portion and the yoke portion layer.

16. The thin-film magnetic head according to claim 15, further comprising an additional insulating layer that covers the first portion of the coil placed in the coil encasing portion and has a surface facing the yoke portion layer, the surface being flattened together with a surface of the pole portion layer facing the yoke portion layer, the second portion of the coil being located between the additional insulating layer and the yoke portion layer.

17. The thin-film magnetic head according to claim 1, further comprising: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

18. A method of manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer having flat top and bottom surfaces and provided between the pole portions of the first and second magnetic layers; and a thin-film coil at least a part of which is placed between the first and second magnetic layers, the at least part of the coil being insulated from the first and second magnetic layers; the method including the steps of:
forming the first magnetic layer;
forming the gap layer on the first magnetic layer;
forming the second magnetic layer on the gap layer; and
forming the coil such that the at least part of the coil is placed between the first and second magnetic layers, the at least part of the coil being insulated from the first and second magnetic layers; wherein:
the step of forming one of the magnetic layers includes formation of an insulating layer encasing portion in the one of the magnetic layers, the insulating layer encasing portion having an end on a side of the medium facing surface, the end of the insulating layer encasing portion defining a throat height, the insulating layer encasing portion being provided for encasing an insulating layer for defining the throat height between the gap layer and the one of the magnetic layers; the method further including the steps of:
forming the insulating layer for defining the throat height placed in the insulating layer encasing portion; and
forming a coil encasing portion having a depth that extends from a level of the gap layer in the medium facing surface toward the first magnetic layer and toward the second magnetic layer, the coil encasing portion having an end on a side of the medium facing surface located farther from the medium facing surface than the end of the insulating layer encasing portion, the coil encasing portion being provided for encasing the at least part of the coil; wherein the at least part of the coil is placed in the coil encasing portion in the step of forming the coil.

19. The method according to claim 18 wherein the at least part of the coil is placed in the coil encasing portion so as to extend from the level of the gap layer toward the first magnetic layer and toward the second magnetic layer in the step of forming the coil.

20. The method according to claim 18 wherein:
the step of forming the second magnetic layer includes the steps of:
forming a first pole portion layer a portion of which makes up a part of one of the pole portions and has a length equal to the throat height, one of surfaces of the first pole portion layer being adjacent to the gap layer;
forming a second pole portion layer including the other part of the one of the pole portions, a part of one of surfaces of the second pole portion layer touching the other surface of the first pole portion layer, the part of the second pole portion layer touching the first pole portion layer having a width equal to a recording track width, an entire length of the second pole portion layer being greater than the length of the portion of the first pole portion layer that makes up the part of the one of the pole portions;
etching the first pole portion layer through the use of the second pole portion layer as a mask, such that the parts of the first and second pole portion layers touching each other are made equal in width; and
forming a yoke portion layer making up a yoke portion and connected to the other surface of the second pole portion layer; wherein
the insulating layer encasing portion is formed between the gap layer and a part of the one of the surfaces of the second pole portion layer that does not touch the other surface of the first pole portion layer.

21. The method according to claim 20 wherein the coil encasing portion is formed by etching the first magnetic layer through the use of the second pole portion layer as a mask in the step of forming the coil encasing portion.

22. The method according to claim 20 wherein an end face of the yoke portion layer that faces toward the medium facing surface is located at a distance from the medium facing surface in the step of forming the yoke portion layer.

23. The method according to claim 20, further including the step of flattening a surface of the insulating layer for defining the throat height that faces the second pole portion layer, together with the other surface of the first pole portion layer.

24. The method according to claim 20, further including the step of forming an additional insulating layer that covers the at least part of the coil located in the coil encasing portion and has a surface facing the yoke portion layer, the surface being flattened together with the other surface of the second pole portion layer.

25. The method according to claim 20 wherein the step of forming the thin-film coil includes formation of: a first portion placed in the coil encasing portion; and a second portion located between the first portion and the yoke portion layer.

26. The method according to claim 25, further including the step of forming an additional insulating layer that covers the first portion of the coil placed in the coil encasing portion and has a surface facing the yoke portion layer, the surface being flattened together with the other surface of the second pole portion layer, wherein
the second portion of the coil is located between the additional insulating layer and the yoke portion layer in the step of forming the coil.

27. The method according to claim 18 wherein:
the step of forming the first magnetic layer includes formation of a first concavity in a surface of the first magnetic layer facing the gap layer, the first concavity being provided as the insulating layer encasing portion; and
the step of forming the coil encasing portion includes formation of a second concavity in the surface of the first magnetic layer facing the gap layer, the second concavity having a depth greater than a depth of the first concavity and making up a part of the coil encasing portion.

28. The method according to claim 27, further including the step of flattening a surface of the insulating layer for defining the throat height facing the gap layer, together with the surface of the first magnetic layer facing the gap layer.

29. The method according to claim 27 wherein the step of forming the second magnetic layer includes formation of: a pole portion layer making up one of the pole portions; and a yoke portion layer making up a yoke portion and connected to the pole portion layer.

30. The method according to claim 29 wherein the coil encasing portion is formed by etching the first magnetic layer through the use of the pole portion layer as a mask in the step of forming the coil encasing portion.

31. The method according to claim 29, further including the step of forming an additional insulating layer that covers the at least part of the coil located in the coil encasing portion and has a surface facing the yoke portion layer, the surface being flattened together with a surface of the pole portion layer facing the yoke portion layer.

32. The method according to claim 29 wherein the step of forming the thin-film coil includes formation of: a first portion placed in the coil encasing portion; and a second portion located between the first portion and the yoke portion layer.

33. The method according to claim 32, further including the step of forming an additional insulating layer that covers the first portion of the coil placed in the coil encasing portion and has a surface facing the yoke portion layer, the surface being flattened together with a surface of the pole portion layer facing the yoke portion layer, wherein
the second portion of the coil is located between the additional insulating layer and the yoke portion layer in the step of forming the coil.

34. The method according to claim 18, further including the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer.

35. The method according to claim 34 wherein at least one of the first and second insulating films is formed through chemical vapor deposition.

* * * * *